(12) United States Patent
Baumann

(10) Patent No.: US 6,244,297 B1
(45) Date of Patent: *Jun. 12, 2001

(54) FLUID PRESSURE REDUCTION DEVICE

(75) Inventor: Hans D. Baumann, Rye, NH (US)

(73) Assignee: Fisher Controls International, Inc., Clayton, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,565

(22) Filed: Mar. 23, 1999

(51) Int. Cl.[7] .................................................. F16K 3/24

(52) U.S. Cl. ............................. 137/625.3; 251/127

(58) Field of Search ........................... 137/625.3, 625.33; 251/127; 38/42

(56) References Cited

U.S. PATENT DOCUMENTS

| | | | |
|---|---|---|---|
| Re. 31,105 | 12/1982 | Bates, Jr. | 137/625.3 |
| Re. 32,197 | 7/1986 | Self | 251/127 |
| 1,243,134 | 10/1917 | Binckley . | |
| 1,650,196 | 11/1927 | Demuth . | |
| 2,126,991 | 8/1938 | Griswold | 225/6 |
| 3,133,557 | 5/1964 | Gongwer | 137/512.1 |
| 3,316,936 | 5/1967 | Gongwer | 137/625.28 |
| 3,323,550 | 6/1967 | Lee, II | 138/39 |
| 3,375,855 | 4/1968 | Deeks | 138/42 |
| 3,513,864 | 5/1970 | Self | 137/14 |
| 3,514,074 | 5/1970 | Self | 251/127 |
| 3,529,628 | 9/1970 | Cummins | 137/625.3 |
| 3,532,126 | 10/1970 | Boothe | 138/43 |
| 3,631,891 | 1/1972 | Brumm | 137/625.3 |
| 3,678,963 | 7/1972 | Betts et al. | 138/41 |
| 3,688,800 | 9/1972 | Hayner et al. | 138/42 |
| 3,722,854 | 3/1973 | Parola | 251/127 |
| 3,780,767 | 12/1973 | Borg et al. | 137/625.3 |
| 3,802,537 | 4/1974 | White | 181/36 R |
| 3,813,079 | 5/1974 | Baumann et al. | 251/127 |
| 3,856,049 | 12/1974 | Scull | 138/42 |
| 3,894,716 | 7/1975 | Barb | 251/127 |
| 3,899,001 | 8/1975 | Orme | 137/625.3 |
| 3,908,698 | 9/1975 | Baumann | 137/625.3 |
| 3,917,221 | 11/1975 | Kubota et al. | 251/127 |
| 3,921,668 | 11/1975 | Self | 137/625.3 |

(List continued on next page.)

OTHER PUBLICATIONS

H.D. Baumann, "Coefficients and Factors Relating to the Aerodynamic Sound Level Generated by Throttling Valves", Noise Control Engineering Journal, Jan./Feb. 1984, pp. 6–11.

H.D. Baumann, "The Introduction of a Critical Flow Factor for Valve Sizing", Abstract, Apr. 1993, pp. 34.3.62–1 to 34.3.62–6.

Primary Examiner—John Fox
(74) Attorney, Agent, or Firm—Wolf, Greenfield & Sacks, P.C.

(57) ABSTRACT

A multi-plate, anti-cavitation fluid pressure reduction device includes a stack of annular plates having a hollow center, a fluid inlet at an inner perimeter thereof and a fluid outlet at an outer perimeter thereof. Selected ones of the plates each define at least one pressure reduction stage including an orifice having a well-rounded or well-tapered inlet and an abrupt discharge, and a communication passage coupled to the discharge. Each pressure reduction stage communicates with another pressure reduction stage in an adjacent one of the annular plates in the stack. Two or more pressure reduction stages are coupled in series to define a pressure reduction flow path from the fluid inlet to the fluid outlet. Each pressure reduction stage is preferably characterized by a velocity head loss greater than 75% and a corresponding pressure recovery less than 25%. The fluid pressure reduction device is typically incorporated into a fluid control valve.

39 Claims, 13 Drawing Sheets

U.S. PATENT DOCUMENTS

| | | | |
|---|---|---|---|
| 3,941,350 | 3/1976 | Kluczynski | 251/127 |
| 3,954,124 | 5/1976 | Self | 138/42 |
| 3,971,411 | 7/1976 | Baumann | 137/625.3 |
| 3,978,891 | 9/1976 | Vick | 138/42 |
| 3,995,664 | 12/1976 | Nelson | 138/43 |
| 4,008,737 | 2/1977 | Kluczynski et al. | 137/625.3 |
| 4,024,891 | 5/1977 | Engel et al. | 137/625.3 |
| 4,060,099 | 11/1977 | Bates, Jr. | 137/625.3 |
| 4,068,683 | 1/1978 | Self | 137/625.3 |
| 4,079,754 | 3/1978 | Porter | 138/42 |
| 4,105,048 | 8/1978 | Self | 138/42 |
| 4,125,129 | 11/1978 | Baumann | 137/625.3 |
| 4,127,146 | 11/1978 | Self | 137/625.3 |
| 4,221,037 | 9/1980 | Seger | 29/157.1 R |
| 4,249,574 | 2/1981 | Schnall et al. | 137/625.3 |
| 4,258,750 | 3/1981 | Schnall et al. | 137/625.3 |
| 4,267,045 | 5/1981 | Hoof | 210/322 |
| 4,279,276 | 7/1981 | Seger | 138/42 |
| 4,327,757 | 5/1982 | Weevers | 137/625.3 |
| 4,335,744 | 6/1982 | Bey | 137/522 |
| 4,352,373 | 10/1982 | Kay et al. | 137/561 A |
| 4,356,843 | 11/1982 | Baumann | 138/43 |
| 4,398,563 | 8/1983 | Kay et al. | 138/42 |
| 4,407,327 | 10/1983 | Hanson et al. | 137/625.3 |
| 4,429,714 | 2/1984 | Hughes et al. | 137/625.3 |
| 4,456,033 | 6/1984 | Kay et al. | 138/42 |
| 4,473,210 | 9/1984 | Brighton | 251/127 |
| 4,479,510 | 10/1984 | Bey | 137/625.31 |
| 4,567,915 | 2/1986 | Bates et al. | 138/42 |
| 4,617,963 | 10/1986 | Stares | 137/625.3 |
| 4,665,946 | 5/1987 | Hulsey | 137/625.3 |
| 4,671,321 | 6/1987 | Paetzel et al. | 137/625.3 |
| 4,921,014 | 5/1990 | Tartaglia et al. | 137/625.3 |
| 4,938,450 | 7/1990 | Tripp et al. | 251/30.03 |
| 5,687,763 | 11/1997 | Steinke | 137/625.33 |
| 5,769,122 | 6/1998 | Baumann | 137/625.33 |
| 6,026,859 * | 2/2000 | Wears et al. | 137/625.33 |

* cited by examiner

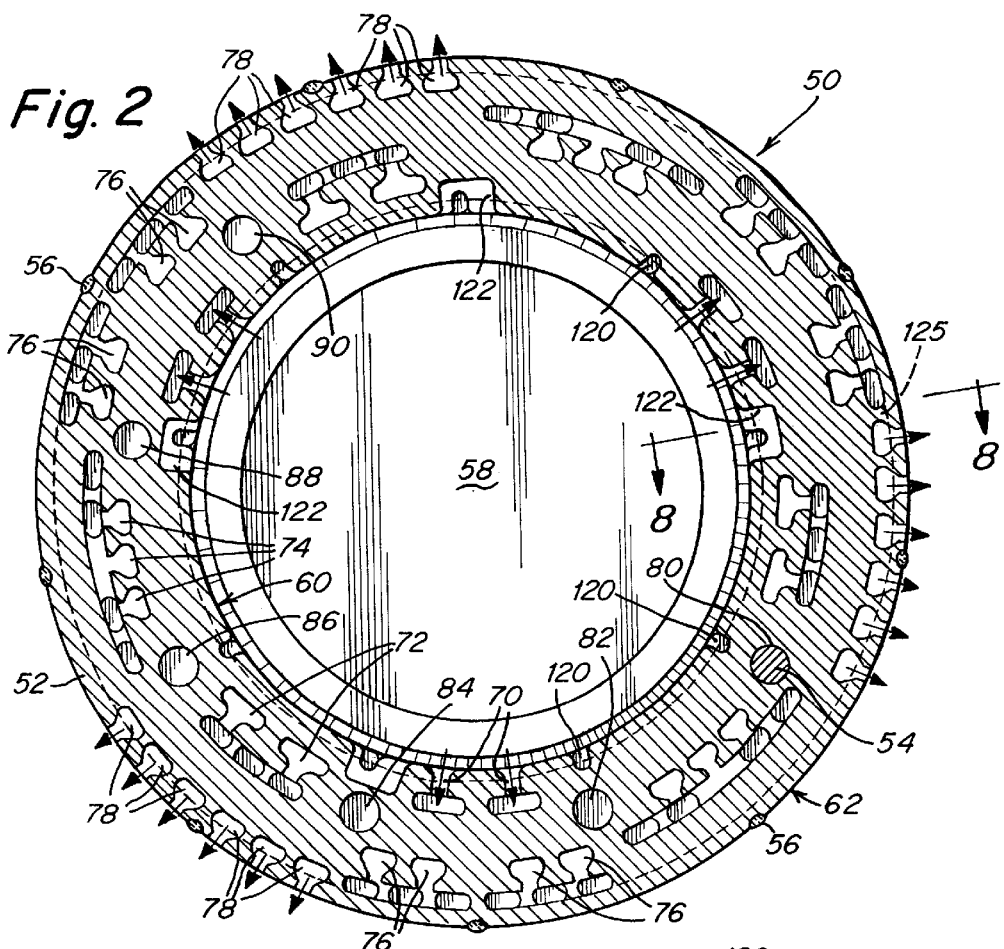
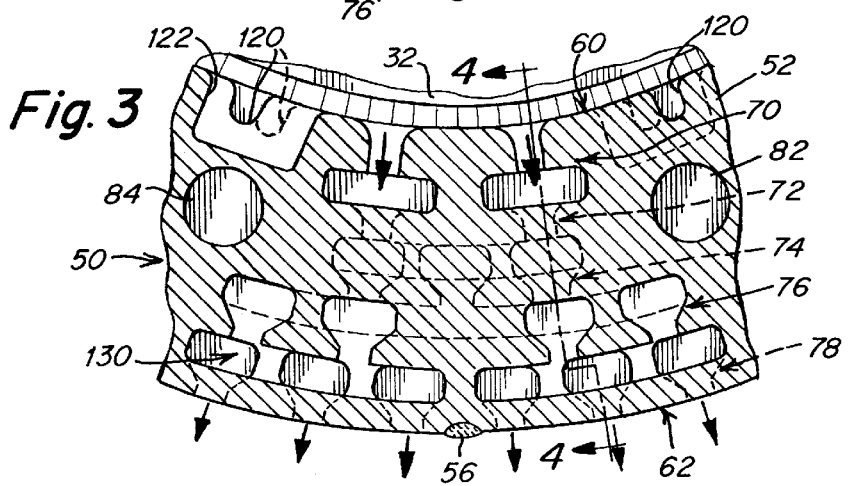
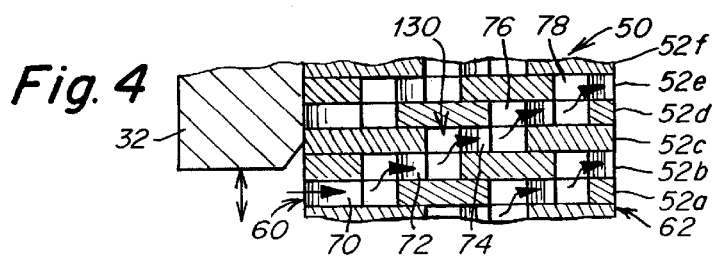

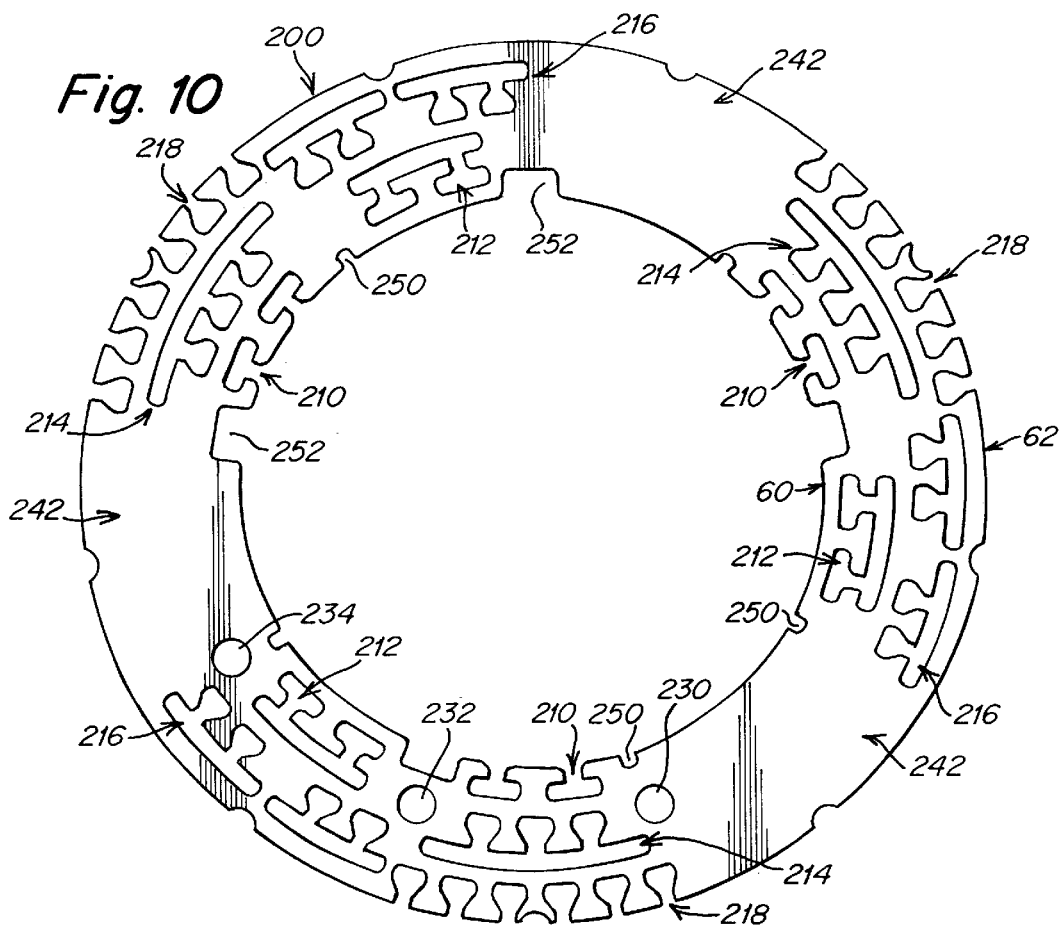
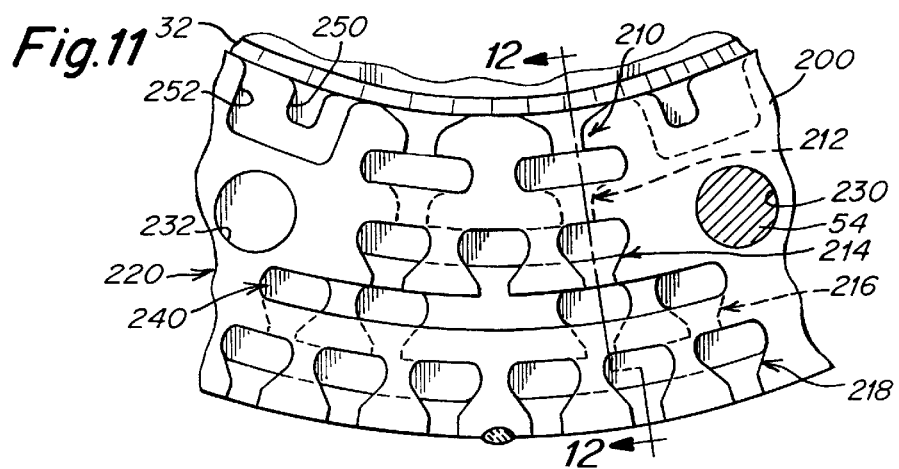
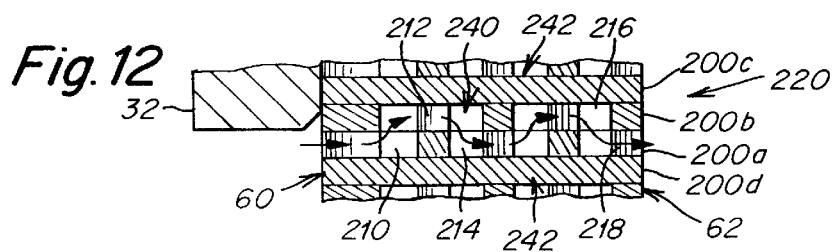

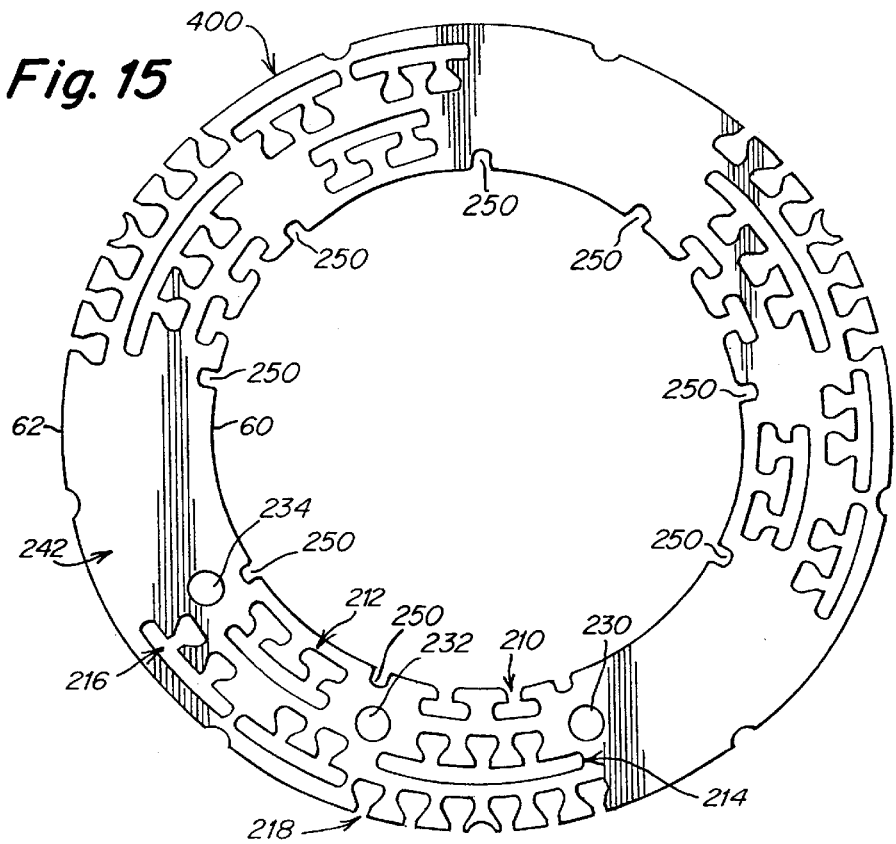
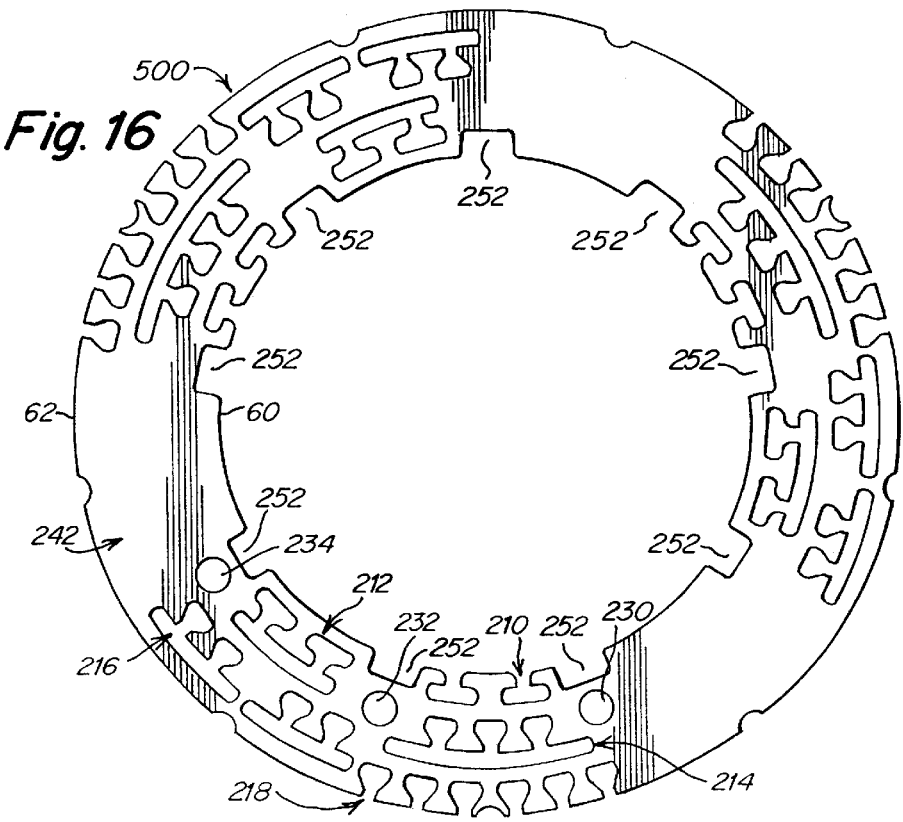

FLUID PRESSURE REDUCTION DEVICE

FIELD OF THE INVENTION

This invention relates to fluid energy dissipation devices and, more particularly, to anti-cavitation fluid pressure reduction devices including multiple stacked plates for liquid flows.

BACKGROUND OF THE INVENTION

Fluid pressure reduction devices are commonly used in valves. One well-known type of fluid pressure reduction device includes a stack of annular disks mounted within a fluid control valve. The stack of disks, often referred to as a "valve trim" or a "valve cage", defines a plurality of flow passages between a hollow center and an outer periphery. A valve member is movable through the hollow center to connect more or fewer of the flow passages between the valve inlet and outlet. Such devices have utilized changes in flow direction and increases in the cross-sectional area of the flow passages to reduce pressure. However, prior art fluid pressure reduction devices have not effectively applied the principles of fluid mechanics to the design of the fluid flow passages to prevent the static head from reaching the vapor pressure of the fluid, while achieving substantial pressure reduction.

A stacked valve trim which uses identical hole patterns and which creates a diagonal radial flow path is described in U.S. Pat. No. 3,529,628, issued Sep. 22, 1970 to Cummins. However, the openings in the disks were highly irregular and created between them an unpredictable resistance path. The flow paths were not designed using effective principles of fluid mechanics. Furthermore, Cummins disclosed no way to pressurize the annular area between the plug and the annular bore to avoid damage between a radial pressurized path and the next unpressurized path.

U.S. Pat. No. 4,125,129, issued Nov. 14, 1978 to Baumann also discloses a multi-plated valve trim with identical annular disks, which when angularly offset, create a vertical flow path, as shown in FIG. 14. FIGS. 18 and 19 also show identical plates which are angularly offset from each other to form a vertical flow path. However, using round holes as throttling orifices greatly reduces the flow capacity and creates a high amount of contraction due to the sharp entrances to the holes, leading to excessive pressure recovery. Similar identical plates selectively overlapped and having radial, rectangular flow slots for throttling in the horizontal direction and in one plane are disclosed in U.S. Pat. No. 4,356,843, issued Nov. 2, 1982 to Baumann.

U.S. Pat. No. 5,769,122, issued Jun. 23, 1998 to Baumann et al. discloses fluid pressure reduction devices including plates having restrictions with streamlined inlets followed by long and wide settling chambers after each contraction and providing radially outward flow paths in two planes. The configuration shown in FIGS. 10 and 11 and orifices 62 shown in FIG. 7, for example, permit a gradual decrease in velocity, corresponding to high pressure recovery, which may be suitable for gases in order to obtain supersonic velocities, but is detrimental for liquids which are prone to cavitate. The '122 patent also teaches several restrictions within one horizontal plane, allowing for unhindered pressure recovery of at least 50%.

U.S. Pat. No. 5,687,763, issued Nov. 18, 1997 to Steinke discloses a fluid flow control device having tortuous turns within radial flow paths created between openings of a pair of identical plates. The pressure drop is created through abrupt turns rather than by the use of orifices. Furthermore, there is no provision for gradual pressure reduction along the gap between the valve plug and the cage bore.

All of the known prior art fluid pressure reduction devices have exhibited one or more disadvantages, including but not limited to cavitation, insufficient pressure reduction, failure to provide for gradual pressure reduction along the gap between the valve plug and the cage bore, low flow capacity and difficulty in manufacturing. Accordingly, there is a need for new and improved fluid pressure reduction devices.

SUMMARY OF THE INVENTION

According to a first aspect of the invention, a fluid pressure reduction device is provided. The fluid pressure reduction device comprises a stack of annular plates having a hollow center, a fluid inlet at a first perimeter thereof and a fluid outlet at a second perimeter thereof. Selected ones of the plates each define at least one pressure reduction stage comprising an orifice having a well-rounded or well-tapered inlet and an abrupt discharge, and a communication passage coupled to the discharge. Each pressure reduction stage communicates with another pressure reduction stage in an adjacent one of the annular plates in the stack. Two or more of the pressure reduction stages are coupled in series to define a pressure reduction flow path from the fluid inlet to the fluid outlet.

The fluid pressure reduction device is used with a movable plug engaged within the hollow center. The annular plates preferably define at least one axial flow path through the stack for a gradual reduction of fluid pressure at different axial levels in the stack of annular plates. The axial flow path may open onto the hollow center of the stack of annular plates or may be located radially outwardly of the hollow center.

In one embodiment, the pressure reduction flow path is defined by a plurality of pressure reduction stages in series, and includes radial and axial flow components which alternate between adjacent plates in the stack of annular plates. The stack of annular plates preferably defines two or more pressure reduction flow paths in parallel. In another embodiment, the pressure reduction flow path is defined by a plurality of pressure reduction stages in series, and includes radial and axial flow components through successive plates in the stack of annular plates. The stack of annular plates preferably defines two or more pressure reduction flow paths in parallel. In this embodiment, the number of annular plates defining each pressure reduction flow path is equal to the number of pressure reduction stages in the pressure reduction flow path.

The number of orifices and/or the flow areas of the orifices discharging into the communication passage may increase along the pressure reduction flow path. Preferably, the annular plates define a plurality of pressure reduction flow paths in parallel between the fluid inlet and the fluid outlet. Preferably, each pressure reduction stage is characterized by a velocity head loss greater than 75% and by a corresponding pressure recovery of less than 25%. Preferably, the communication passage has a width that is at least 3.5 times the width of the orifice. Where two or more orifices discharge into a single communication passage, the communication passage preferably has a width that is at least 3.5 times the combined widths of the orifices.

According to another aspect of the invention, a fluid control valve is provided. The fluid control valve comprises a valve body having a fluid passageway, a valve seat in the fluid passageway, a valve plug that is movable with respect to the valve seat for controlling the flow of fluid through the fluid passageway, and a fluid pressure reduction device mounted in the fluid passageway for reducing fluid pressure. The pressure reduction device is configured as described above.

BRIEF DESCRIPTION OF THE DRAWINGS

For a better understanding of the present invention, reference is made to the accompanying drawings, which are incorporated herein by reference and in which:

FIG. 2 is a cross-sectional bottom plan view of a first embodiment of a stacked plate assembly and the valve plug, taken along the line 2—2 of FIG. 1;

FIG. 3 is an enlarged fragmentary view of a portion of the stacked plate assembly shown in FIG. 2;

FIG. 4 is a fragmentary cross-sectional view of the stacked plate assembly and valve plug, taken along the line 4—4 of FIG. 3, showing a diagonal flow path;

FIG. 10 is a bottom plan view of a five stage annular plate used in a stacked plate assembly in accordance with a second embodiment of invention;

FIG. 11 is a enlarged fragmentary view of a portion of a stacked plate assembly employing the annular plate shown in FIG. 10;

FIG. 12 is a fragmentary cross-sectional view of the stacked plate assembly and valve plug, taken along the line 12—12 of FIG. 11;

FIG. 15 is a bottom plan view of a five stage annular plate used in a stacked plate assembly in accordance with a fourth embodiment of the invention;

FIG. 16 is a bottom plan view of a five stage annular plate used in a stacked plate assembly in accordance with a fifth embodiment of the invention;

DETAILED DESCRIPTION

Figure 1:
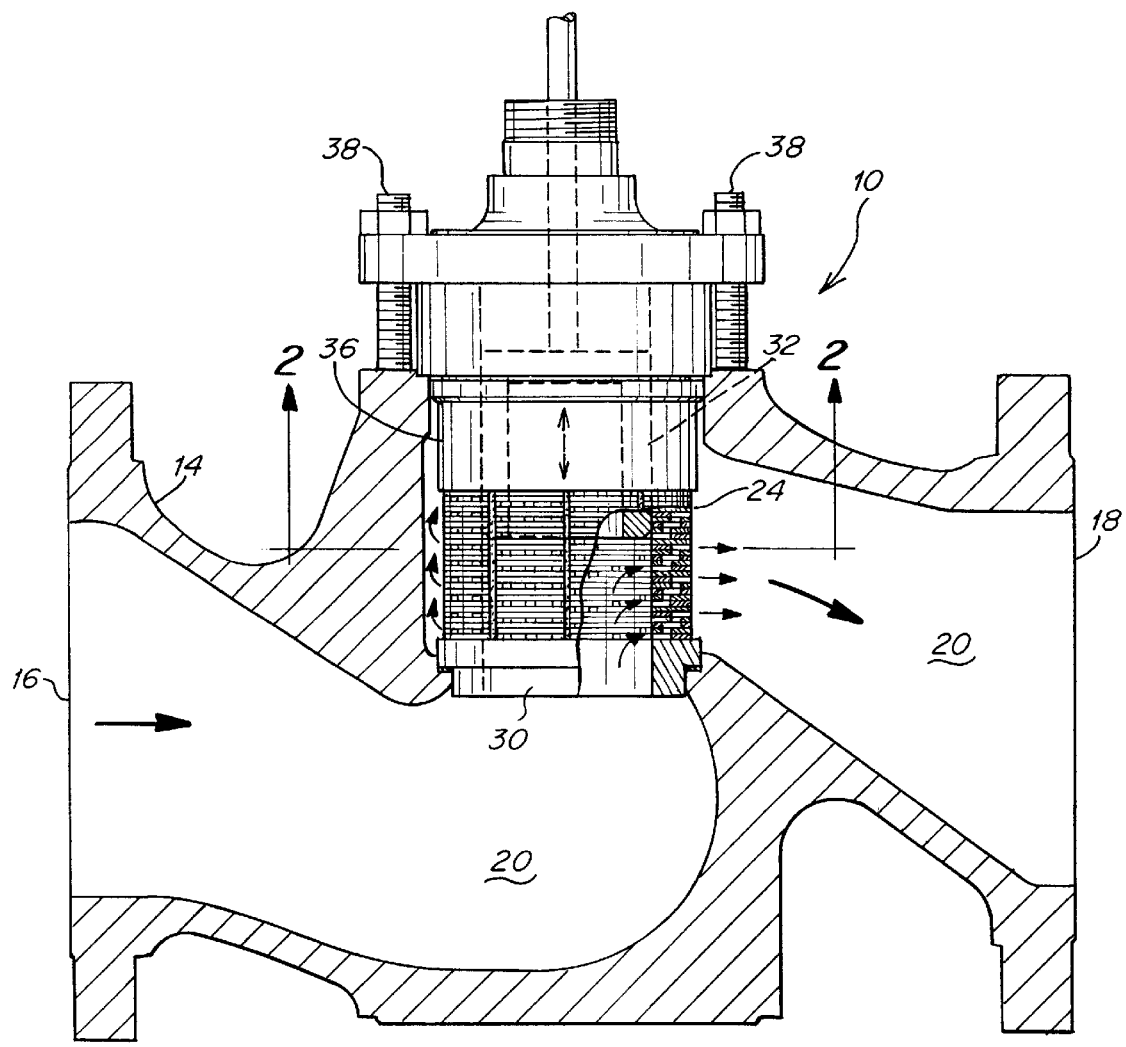
FIG. 1 is a cross-sectional side view of a valve incorporating a fluid pressure reduction device in the form of a stacked plate assembly in accordance with the invention.

A cross-sectional view of a fluid control valve incorporating a fluid pressure reduction device in accordance with the invention is shown in FIG. 1. A fluid control valve 10 includes a valve body 14 having a fluid inlet 16, a fluid outlet 18 and a connecting fluid passage 20 through the valve body 14. A fluid pressure reduction device 24, also known as a "valve cage" or a "valve trim", is mounted within fluid control valve 10. The pressure reduction device 24 may be mounted within the valve using a conventional mounting arrangement, including a seat ring 30, a retainer 36 and mounting bolts 38. The fluid pressure reduction device 24 is in the form of a stacked plate assembly having a hollow center. A movable plug 32 located in the hollow center of the stacked plate assembly controls fluid flow from the hollow center to the exterior of the stacked plate assembly.

A fluid pressure reduction device in accordance with a first embodiment of the invention is shown in FIGS. 2–9, where like elements have the same reference numerals. Fluid pressure reduction device 24 comprises a stacked plate assembly 50 including a stack of annular plates 52 and a registration pin 54. The registration pin 54 passes through a registration hole in each annular plate 52 and maintains the proper registration between annular plates in the stack, as described below. The annular plates 52 may be secured together by welds 56 around the periphery of the stacked plate assembly or may be brazed together. The stacked plate assembly 50 is retained in valve 10 between seat ring 30 and retainer 36. (FIG. 1). The stacked plate assembly 50 has a hollow center 58; a first or inner perimeter 60 serves as a fluid inlet to the pressure reduction device, and a second or outer perimeter 62 serves as a fluid outlet of the pressure reduction device. Inner perimeter 60 is dimensioned for a close fit to the outer surface of valve plug 32. As described below, stacked plate assembly 50 defines a plurality of pressure reduction flow paths from the inlet at inner perimeter 60 to the outlet at outer perimeter 62. As valve plug 32 is moved upwardly or downwardly with respect to stacked plate assembly 50, more or fewer of the pressure reduction flow paths are exposed at inner perimeter 60, and the flow capacity through the fluid pressure reduction device is increased or decreased.

Figure 5:
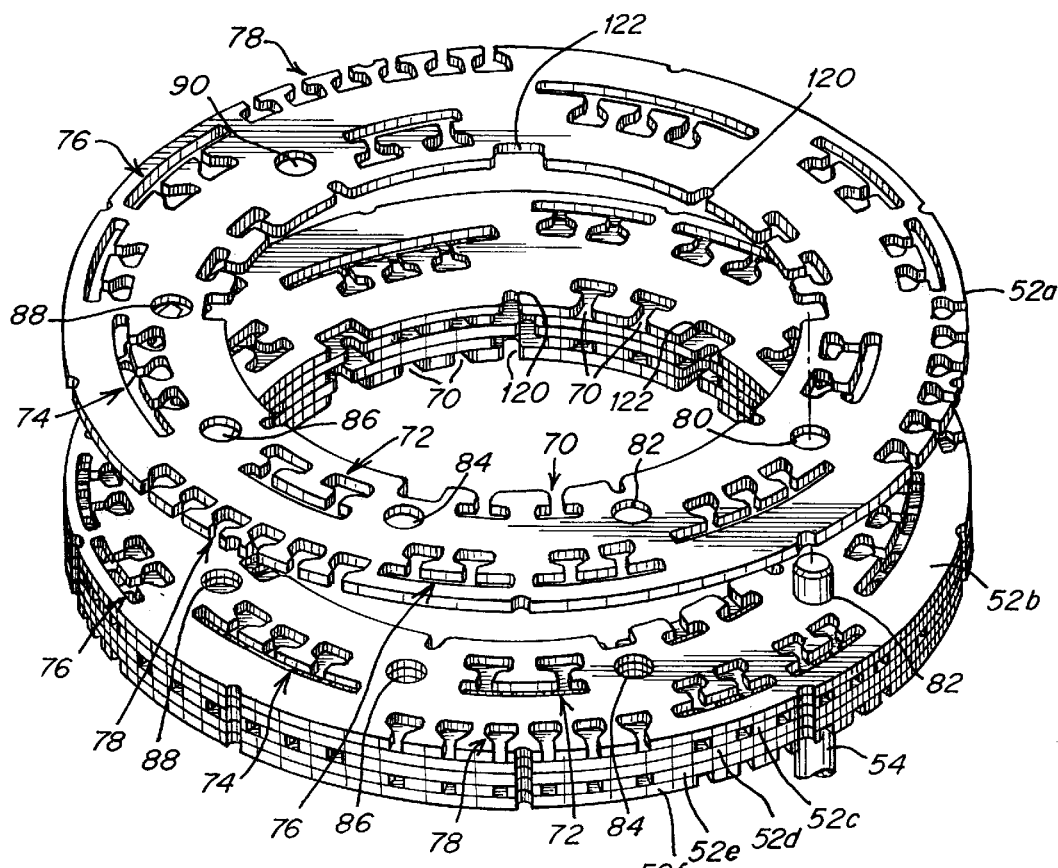
FIG. 5 is an exploded bottom perspective view of six plates in the stacked plate assembly, showing plate registration.

The stacked plate assembly 50 shown in the embodiment of FIGS. 2–9 utilizes a stack of identical annular plates 52, oriented as described below, to provide a plurality of pressure reduction flow paths between the inlet and the outlet. Each pressure reduction flow path is defined by five pressure reduction stages in five successive annular plates 52 rotated relative to each other in the embodiment of FIGS. 2–9. An exploded bottom perspective view of six annular plates 52a, 52b, 52c, 52d, 52e and 52f is shown in FIG. 5. Each of the annular plates 52a, 52b, 52c, 52d, 52e and 52f is provided with a first pressure reduction stage 70, a second pressure reduction stage 72, a third pressure reduction stage 74, a fourth pressure reduction stage 76 and a fifth pressure reduction stage 78. Each stage includes one or more orifices followed by one or more communication passages, as described below. The second, third and fourth stages include transfer passages that lead into the orifices of the respective stages. The pressure reduction stages are rotationally offset by 40° relative to one another on each individual plate. The pattern of five stages is repeated around the circumference of the annular plate 52 to form a total of three patterns of five stages each. Because of the rotational offset of stages and the repeating pattern, the first stage 70 and the fourth stage 76 are rotationally aligned, and the second stage 72 and the fifth stage 78 are rotationally aligned.

Pressure reduction flow paths from the inner perimeter 60 to the outer perimeter 62 of stacked plate assembly 50 are provided by stacking annular plates 52 with rotational offsets as shown in FIG. 5. Five identical annular plates 52 are required to provide a pressure reduction flow path in the embodiment of FIGS. 2–9. Further, in the embodiment of FIGS. 2–9, six different rotational offsets are utilized in a repeating configuration in the stacked plate assembly. The basic configuration of six identical annular plates with rotational offsets is shown in FIG. 5. The annular plates 52 are provided with registration holes 80, 82, 84, 86, 88 and 90 rotationally offset from each other by 40°. As shown in FIG. 5, registration pin 54 passes through registration hole 80 in annular plate 52a, through registration hole 82 in annular plate 52b, through registration hole 84 in annular plate 52c, through registration hole 86 in annular plate 52d, through registration hole 88 in annular plate 52e, and through registration hole 90 in annular plate 52f. The configuration of FIG. 5 may be repeated in the stacked plate assembly.

With these rotational orientations, the outlet of each first stage 70 on plate 52a (FIG. 4) is aligned with the inlet of the respective second stage 72 on the next plate 52b; the outlet of each second stage 72 is aligned with the inlet of the respective third stage 74 on the next adjacent plate 52c; the outlet of each third stage 74 is aligned with the inlet of the respective fourth stage 76 on the next adjacent plate 52d; and the outlet of each fourth stage 76 is aligned with the inlet of the respective fifth stage 78 on the next adjacent plate 52e. The fifth stage discharges to the outer perimeter 62 of the stacked plate assembly 50.

A pressure reduction flow path 130 implemented by the five stage stacked plate assembly 50 of FIGS. 2–9 is illustrated in FIG. 3. The flow paths of the first stage 70, the second stage 72, the third stage 74, the fourth stage 76, and the fifth stage 78 are superimposed in FIG. 3 to illustrate pressure reduction flow path 130. It will be understood that pressure reduction flow path 130 is made up of a number of subpaths. In particular, first stage 70 includes two orifices, second stage 72 includes two orifices, third stage 74 includes three orifices, fourth stage 76 includes four orifices, and fifth stage 78 includes six orifices. Each group of five plates in the stacked plate assembly includes three pressure reduction flow paths 130 in parallel around its circumference.

As best shown in FIG. 4, the pressure reduction flow path 130 through a five plate section of stacked plate assembly 50 includes a radial flow and orificial throttling component from inner perimeter 60 through first stage 70 in plate 52a, an axial flow component from plate 52a to plate 52b, a radial flow and orificial throttling component through second stage 72 in plate 52b, an axial flow component from plate 52b to plate 52c, a radial flow and orificial throttling component through third stage 74 in plate 52c, an axial flow component from plate 52c to plate 52d, a radial flow and orificial throttling component through fourth stage 76 in plate 52d, an axial flow component from plate 52d to plate 52e and a radial flow and orificial throttling component through fifth stage 78 to outer perimeter 62. The flow path 130 thus progresses through five successive plates in the stacked plate assembly 50 and includes radial and orificial throttling components, and axial flow components, with a general direction that may be considered "diagonal" flow with respect to a cross-section of the stacked plate assembly 50.

As shown in FIGS. 2, 3 and 5, first stage 70 includes two orifices connected to respective communication passages; second stage 72 includes two orifices connected to a single larger communication passage; third stage 74 includes three orifices connected to a single, relatively wide communication passage; fourth stage 76 includes two pairs of orifices, each pair of which is connected to a single relatively wide communication passage; and fifth stage 78 includes six orifices connected to the outer perimeter 62 of stacked plate assembly 50. Thus, the number of orifices increases as the flow progresses through the pressure reduction flow path (except between the first and second stages).

Figure 6:
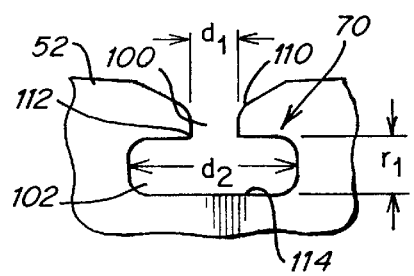
FIG. 6 is a fragmentary enlarged plan view of an orifice and a communication passage shown in FIG. 5.
Figure 29:
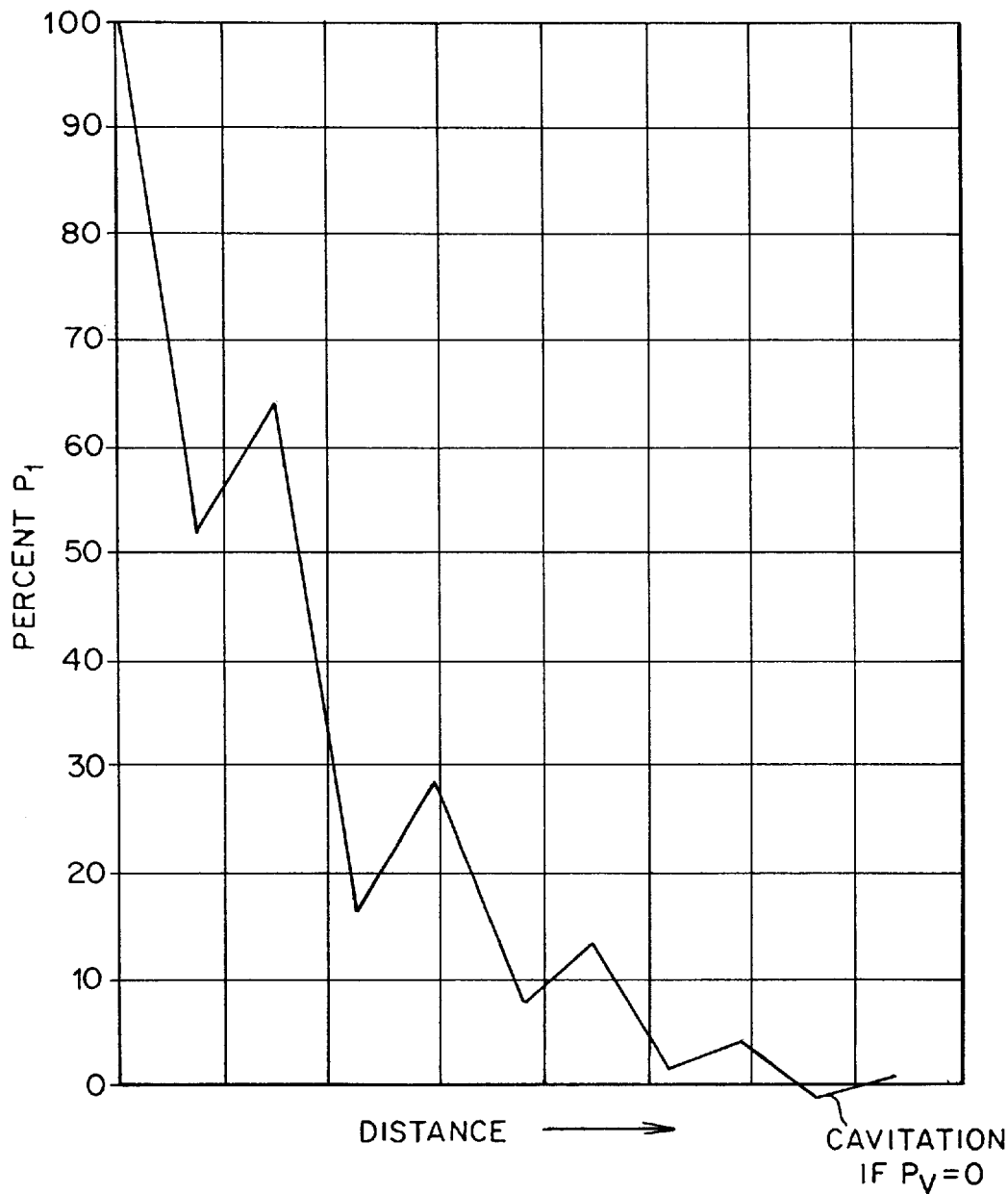
FIG. 29 is a graph of percent static pressure as a finction of distance in the second embodiment of the stacked plate assembly in accordance with the invention.

A fragmentary view of a part of first stage 70 is shown in FIG. 6. The illustrated geometry has features that are common to each pressure reduction stage of the pressure reduction flow path. A pressure reduction stage includes an orifice 100 that discharges into a communication passage 102. Orifice 100 is characterized by a well-rounded inlet 110 in order to achieve minimum contraction, i.e., high flow capacity, and by an abrupt discharge 112 which, together with an adjacent wall 114 of communication passage 102 provides a velocity head loss above 75% in order to reduce the corresponding pressure recovery to less than 25%. In general, the orifices in the pressure reduction stages may have well-rounded or well-tapered inlets. As described above, communication passage 102 is followed by second stage 72 in an adjacent annular plate. The number of orifices and/or the flow areas of the orifices in successive stages increases in order to prevent the static head within each communication passage or transfer passage from reaching the vapor pressure of the fluid due to the fluid velocity head, as shown in FIG. 29 and discussed below.

Figure 7:
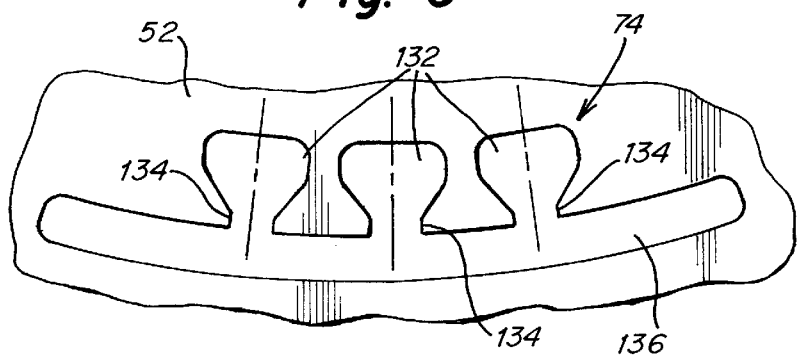
FIG. 7 is a fragmentary enlarged plan view of the third pressure reduction stage shown in FIG. 5.

Third pressure reduction stage 74 is shown in FIG. 7. The pressure reduction stages, other than the first and the last, include one or more transfer passages. Third pressure reduction stage 74 includes transfer passages 132 coupled through respective orifices 134 to a communication passage 136. Orifices 134 are characterized by a well-tapered inlet and by an abrupt discharge. Communication passage 136 is preferably at least 3.5 times as wide in the circumferential direction as the combined widths of orifices 134. Transfer passages 132 receive fluid from the communication passage of the previous stage in an adjacent annular plate and discharge the fluid through orifices 134 to communication passage 136. Communication passage 136 discharges the fluid into the transfer passages of the following stage in an adjacent annular plate. In the last stage of the stacked plate assembly (the fifth stage 78 in the embodiment of FIGS. 2–9), the transfer passages discharge through orifices into the space at the outer perimeter 62 of the stacked plate assembly.

From the laws of fluid mechanics, it is well known that when a fluid discharges from an orifice, such as orifice 100, into an enlarged space, such as communication passage 102, a velocity head loss occurs. This head loss can be calculated as follows:

$$K = \left[1 - \frac{d_1^2}{d_2^2}\right]^2 \quad (1)$$

where K is the velocity head loss coefficient, $d_1$ is the orifice width and $d_2$ is the width of the discharge area or communication passage 102 (see FIG. 6). For example, if $d_2 = 2 d_1$, then the head loss coefficient K is 0.56. However, if the ratio is 3:1, then K=0.79. Preferably, the velocity head loss per stage is greater than 75%, with a corresponding pressure recovery less than 25%.

In the present invention, the ratio of the width $d_2$ of the communication passage 102 to the width $d_1$ of orifice 100 is preferably 3.5 or greater. Where two or more orifices discharge into a single communication passage, the ratio of the width of the communication passage to the combined widths of the orifices is preferably 3.5 or greater. This ratio yields a head loss per stage in excess of 0.80 and an overall head loss coefficient of 0.98 for the five stage embodiment of FIGS. 2–9. Such a high head loss coefficient effectively prevents cavitation by ensuring that the static pressure within the flow passages of the annular plates never reaches the vapor pressure of the fluid. Furthermore, this configuration provides low pressure recovery in each stage, i.e., pressure recovery less than 20%. Preferably, the radial dimension $r_1$ of communication passage 102 is approximately equal to the thickness of the annular plate 52.

Figure 8:
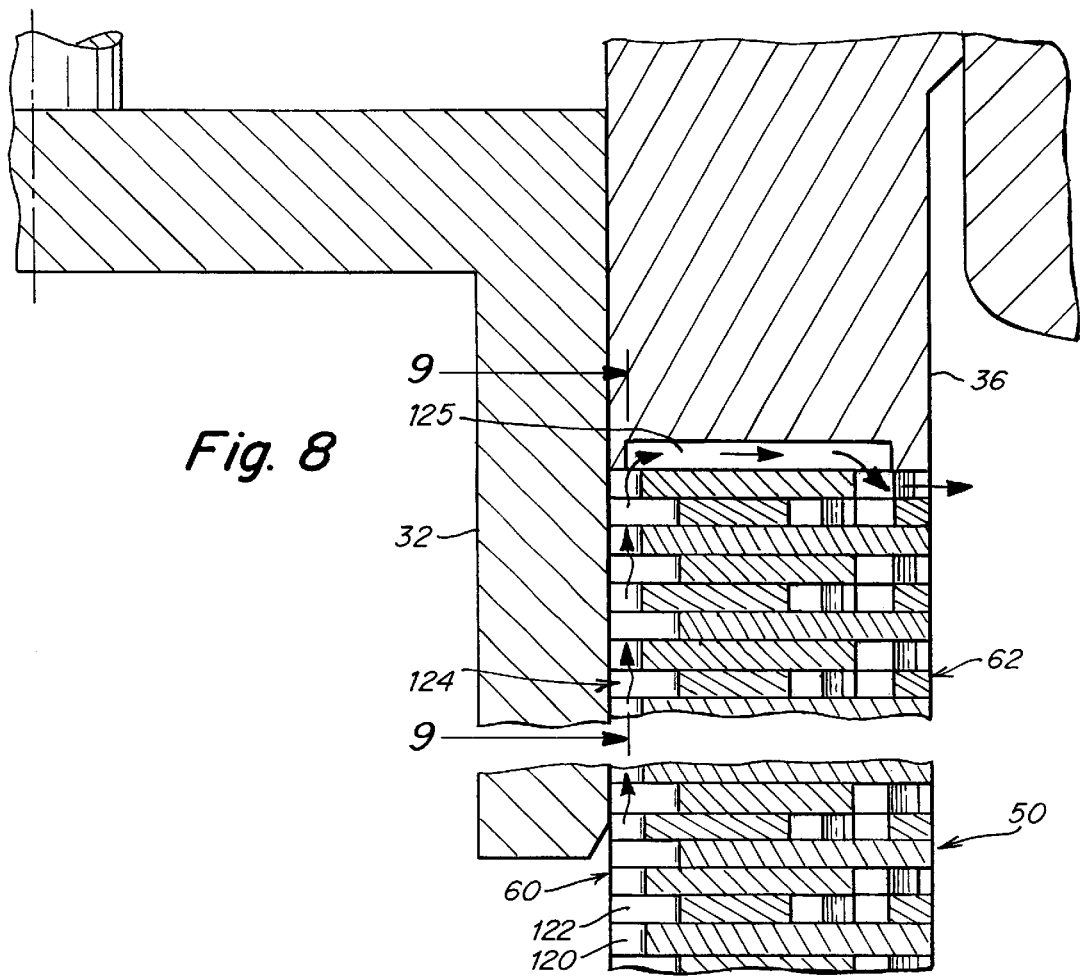
FIG. 8 is an enlarged fragmentary cross-sectional side view of the stacked plate assembly and valve plug, taken along the line 8—8 of FIG. 2, showing a vertical flow path.
Figure 9:
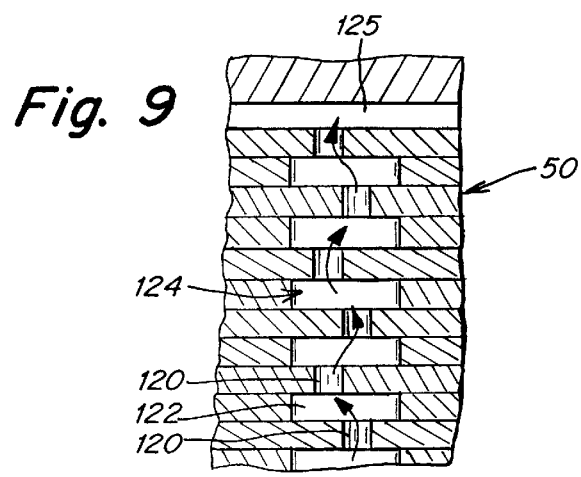
FIG. 9 is an enlarged fragmentary cross-sectional view of the stacked plate assembly, taken along the line 9—9 of FIG. 8.

According to a further feature of the invention, the stacked plate assembly 50 may be provided with one or more axial or "vertical" flow paths, as best shown in FIGS. 8 and 9. It will be understood that the flow is vertical only when the valve is oriented as shown in FIG. 1. In the embodiment of FIGS. 2–9, annular plate 52 is provided with a plurality of narrow vertical flow passages 120 and a plurality of wide vertical flow passages 122 which open onto hollow center 58. When the annular plates 52 are stacked as described above, narrow passages 120 and wide passages 122 are aligned to form a vertical, or axial, flow path 124. In one configuration of vertical flow path 124 shown in FIG. 9, narrow vertical flow passages 120 alternate with wide vertical flow passages 122, and successive narrow vertical flow passages are rotationally offset. The narrow passages 120 constitute throttling flow passages, followed by wide passages 122, which constitute expansion or communication passages. In other configurations of the vertical flow path, one or more narrow vertical flow passages 120 and/or one or more wide vertical flow passages 122 may be aligned in successive annular plates with little or no degradation in performance. The annular plate 52 shown in FIG. 2 has a vertical flow path configuration of this type.

As shown in FIG. 8, the vertical flow path 124 is located along the radial intersection between the inner perimeter 60 of stacked plate assembly 50 and valve plug 32. At the top of the stacked plate assembly 50, retainer 36 may be provided with an annular channel 125 that connects the upper end of vertical flow path 124 with one of the stages in the top annular plate, so that a discharge flow path is provided.

Fluid flow through vertical flow path 124 produces a gradual reduction of fluid pressure at different axial levels in the stack of annular plates. Thus, the region between the surface of plug 32 and the inner perimeter 60 of the stacked plate assembly is selectively pressurized along those plates that are not exposed to fluid flow because of the position of plug 32. This arrangement avoids the situation where the entire pressure differential in the valve is applied across one set of plates in the stack of annular plates.

A second embodiment of the pressure reduction device 24, including a stacked plate assembly 220, is shown in FIGS. 10–13. An annular plate 200 has a five stage configuration including a first pressure reduction stage 210, a second pressure reduction stage 212, a third pressure reduction stage 214, a fourth pressure reduction stage 216, and a fifth pressure reduction stage 218. Each individual stage has the same configuration as the respective stage in annular plate 52. However, in contrast to annular plate 52, first stage 210, third stage 214, and fifth stage 218 are aligned along a first radial direction. Also, second stage 212 and fourth stage 216 are aligned along a second radial direction. The first, third, and fifth stages are rotationally offset from the second and fourth stages by 40°. The five stage pattern is repeated around the circumference of annular plate 200 to form a total of three patterns of five stages each. The five stage patterns are separated by blank areas 242.

In the embodiment of FIGS. 10–13, a five stage pressure reduction flow path is formed by three identical annular plates 200. Annular plate 200 is provided with registration holes 230, 232 and 234 that are rotationally offset from each other by 40°. In the stacked plate assembly 220, registration pin 54 passes through registration hole 230 in a first annular plate 200a, through registration hole 232 in a second annular plate 200b, and through registration hole 234 in a third annular plate 200c. Thus, plates 200a, 200b and 200c are rotationally offset by 40° with respect to each other. This configuration produces a pressure reduction flow path 240, as shown in FIGS. 11 and 12, that alternates between annular plates 200a and 200b. As indicated in FIG. 12, blank area 242 of annular plate 200c and blank area 242 of an annular plate 200d cover the top and bottom, respectively, of pressure reduction flow path 240. Each set of three identical plates in the stacked plate assembly forms a pressure reduction flow path as shown in FIGS. 11 and 12.

Referring to FIG. 12, pressure reduction flow path 240 includes a radial flow and orificial throttling component from inner perimeter 60 through first stage 210 in plate 200a, an axial flow component from first stage 210 in plate 200a to second stage 212 in plate 200b, a radial flow and orificial throttling component through stage 212 in plate 200b, an axial flow component from second stage 212 in plate 200b to third stage 214 in plate 200a, a radial flow and orificial throttling component through third stage 214 in plate 200a, an axial flow component from third stage 214 in plate 200a to fourth stage 216 in plate 200b, a radial flow and orificial throttling component through fourth stage 216 in plate 200b, an axial flow component from fourth stage 216 in plate 200b to fifth stage 218 in plate 200a, and a radial flow and orificial throttling component through fifth stage 218 in plate 200a to the outer perimeter 62 of the stacked plate assembly 220. It may be noted that the flow path 240 alternates between annular plates 200a and 200b, with successive axial flow components having opposite directions. The general flow direction may be considered as radial with respect to the center of the stacked plate assembly 220, or "horizontal" for the valve orientation shown in FIG. 1.

Figure 13:
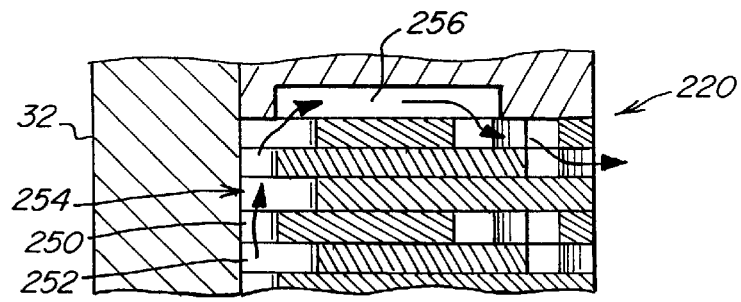
FIG. 13 is a fragmentary cross-sectional view of the stacked plate assembly and valve plug shown in FIG. 11.

Annular plate 200 is further provided with narrow vertical flow passages 250 and wide vertical flow passages 252 that open onto hollow center 58 and form a vertical flow path 254 in the stacked plate assembly 220, as shown in FIG. 13. Retainer 36 is provided with an annular channel 256 that interconnects vertical flow path 254 to the fourth stage of the top annular plate in the stacked plate assembly 220.

Figure 14:
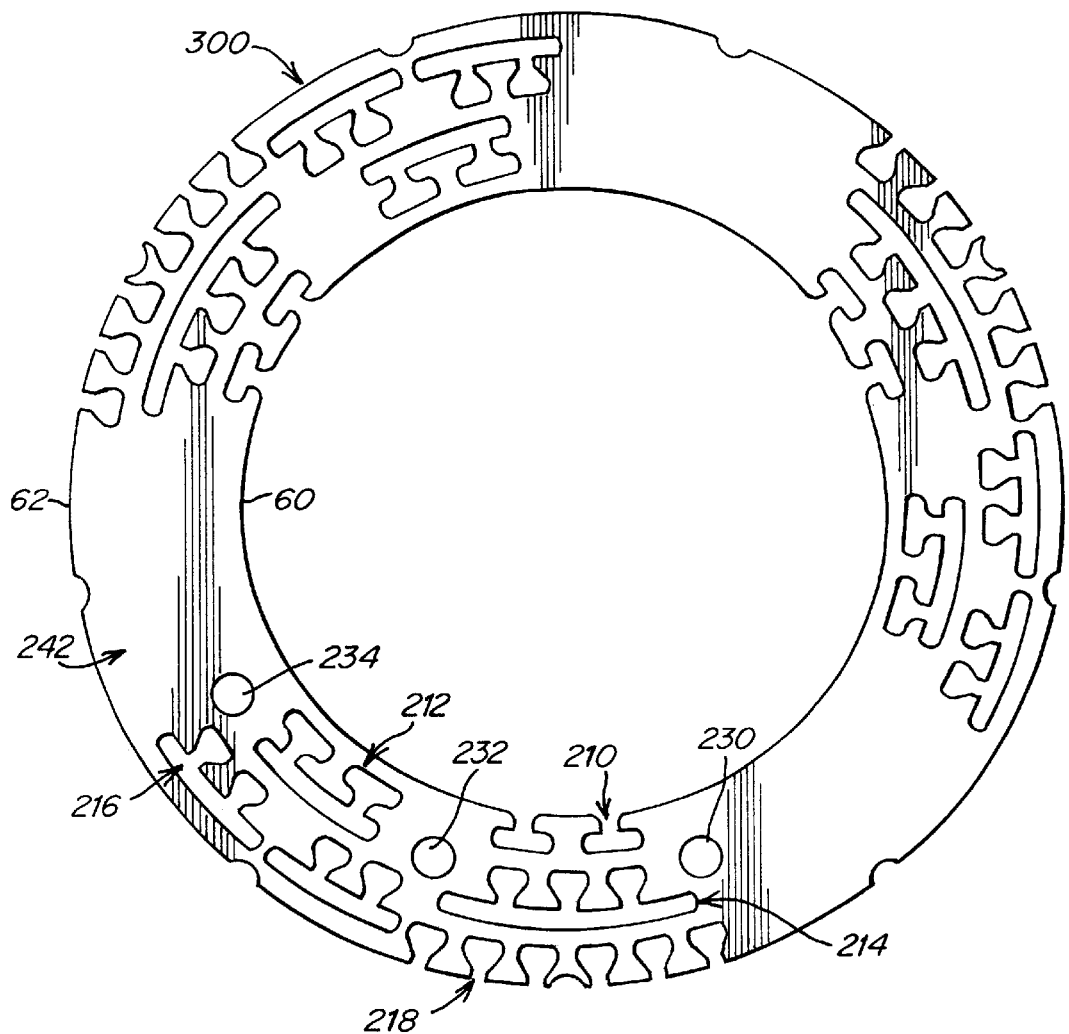
FIG. 14 is a bottom plan view of a five stage annular plate used in a stacked plate assembly in accordance with a third embodiment of the invention.

An annular plate 300 used in a third embodiment of the stacked plate assembly of the present invention is shown in FIG. 14. Annular plate 300 has the same configuration of pressure reduction stages and is stacked in the same manner as the annular plate 200 shown in FIG. 10 and described above. In particular, annular plate 300 includes first stage 210, second stage 212, third stage 214, fourth stage 216, and fifth stage 218. Annular plate 300 differs from annular plate 200 in that annular plate 300 does not include vertical flow passages for forming a vertical flow path as described above in connection with annular plate 200. Thus, the stacked plate assembly using annular plate 300 has horizontal pressure reduction flow paths which alternate between each set of two plates, as shown in FIGS. 11 and 12 and described above. However, the stacked plate assembly does not include vertical flow paths.

An annular plate 400 used in a fourth embodiment of the stacked plate assembly of the present invention is shown in FIG. 15. Annular plate 400 is used in a stacked plate assembly wherein each pressure reduction flow path is defined by five pressure reduction stages, and alternates between each set of two plates. Annular plate 400 has the same configuration of pressure reduction stages and is stacked in the same manner as annular plate 200 shown in FIG. 10 and described above. Annular plate 400 includes first stage 210, second stage 212, third stage 214, fourth stage 216, and fifth stage 218. Annular plate 400 is used to form a five stage horizontal pressure reduction flow path as shown in FIGS. 11 and 12 and described above. Annular plate 400 differs from annular plate 200 in having narrow vertical flow passages 250, but no wide vertical flow passages, for forming a vertical flow path.

An annular plate 500 used in a fifth embodiment of the stacked plate assembly of the present invention is shown in FIG. 16. Annular plate 500 has the same configuration of first stage 210, second stage 212, third stage 214, fourth stage 216, and fifth stage 218, and is stacked in the same manner, as annular plate 200 shown in FIG. and described above. Annular plate 500 is used to form a five stage horizontal pressure reduction flow path as shown in FIGS. 11 and 12 and described above. Annular plate 500 includes wide vertical flow passages 252 for forming a vertical flow path, but no narrow vertical flow passages. Thus, the vertical flow path in the stacked plate assembly utilizing annular plate 500 has a larger flow capacity than the vertical flow path in the stacked plate assembly utilizing annular plate 200 or annular plate 400 (annular plate 300 has no vertical flow passages).

Figure 17:
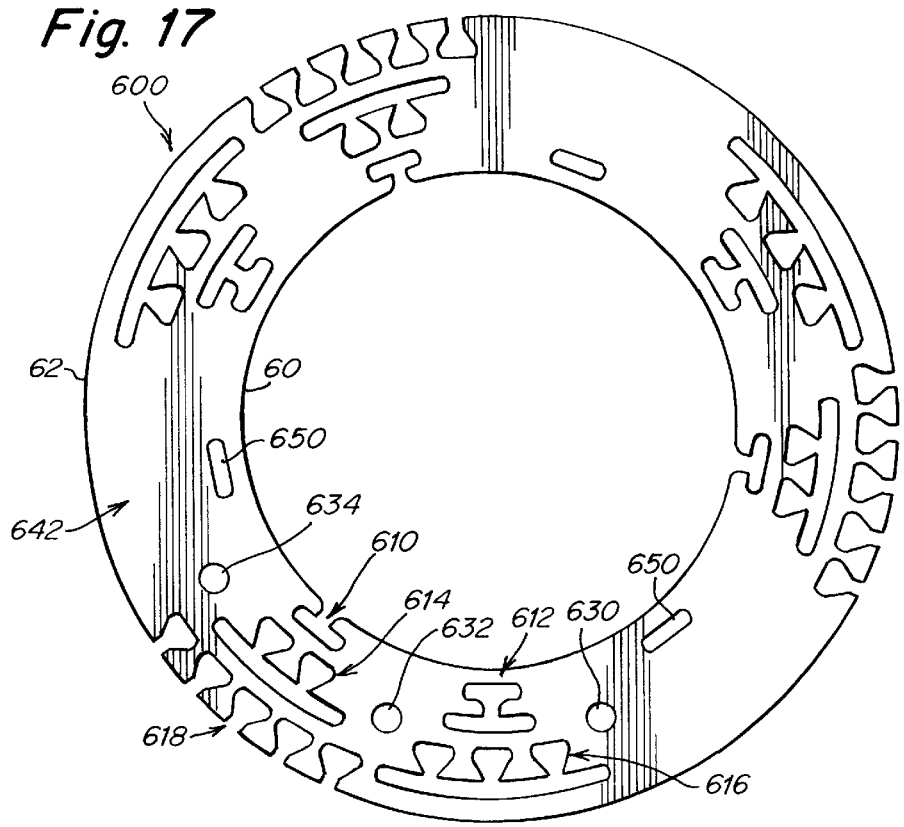
FIG. 17 is a bottom plan view of a five stage annular plate used in a stacked plate assembly in accordance with a sixth embodiment of the invention.
Figure 18:
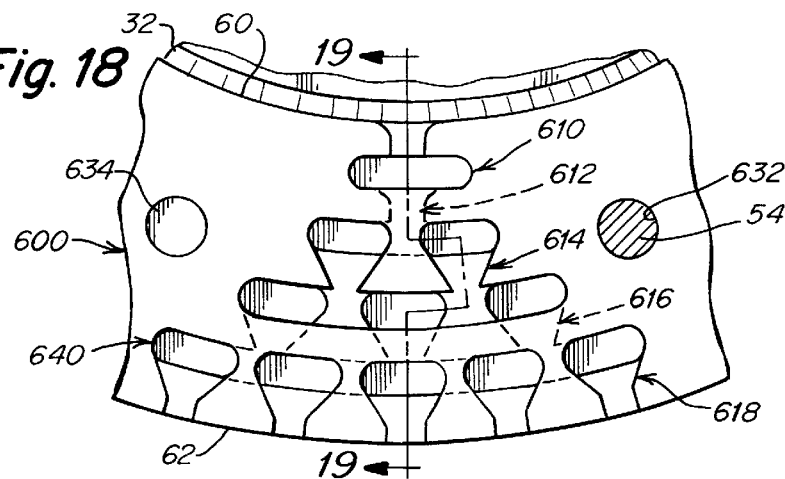
FIG. 18 is an enlarged fragmentary view of a portion of the stacked plate assembly utilizing the annular plate shown in FIG. 17.
Figure 19:
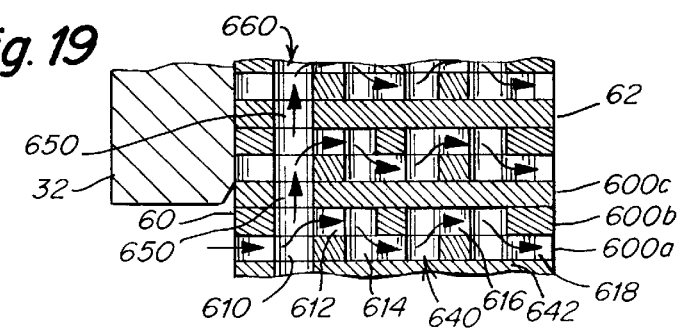
FIG. 19 is an enlarged fragmentary cross-sectional view of the stacked plate assembly and valve plug, taken along the line 19—19 of FIG. 18.

An annular plate 600 used in a sixth embodiment of the stacked plate assembly of the invention is shown in FIG. 17. The pressure reduction flow path in the stacked plate assembly is shown in FIGS. 18 and 19. Annular plate 600 includes a first pressure reduction stage 610, a second pressure reduction stage 612, a third pressure reduction stage 614, a fourth pressure reduction stage 616, and a fifth pressure reduction stage 618. The pattern of five pressure reduction stages is repeated around the circumference of annular plate 600 to provide a total of three patterns of five stages each. The pressure reduction stages have the same general flow properties, with the exception of flow capacity, as the pressure reduction stages described above. Pressure reduction stage 610 has a single orifice, second stage 612 has a single orifice, third stage 614 has two orifices, fourth stage 616 has three orifices, and fifth stage 618 has five orifices. Annular plate 600 is provided with registration holes 630, 632 and 634 rotationally offset by 40° relative to each other. Each set of three plates in the stacked plate assembly forms a pressure reduction flow path 640 as shown in FIGS. 18 and 19. Registration pin 54 passes through registration hole 630 of annular plate 600a, through registration hole 632 of plate 600b and through registration hole 634 of plate 600c. A blank area 642 of plate 600c covers the second and fourth stages in plate 600b.

As shown in FIG. 19, pressure reduction flow path 640 alternates between plates 600a and 600b. In particular, flow path 640 extends from inner perimeter 60 through first stage 610 in plate 600a, through second stage 612 in plate 600b, through third stage 614 in plate 600a, through fourth stage 616 in plate 600b, and through fifth stage 618 in plate 600a to outer perimeter 62.

Annular plate 600 is further provided with vertical flow passages 650 that are spaced radially outwardly from the inner perimeter 60 of annular plate 600. When annular plates 600a are stacked as described above with 40° rotational offsets relative to each other, the vertical flow passages 650 are aligned with the communication passage at the outlet of first stage 610 and with the transfer passages at the inlet of second stage 612, as shown in FIG. 19, to form a vertical flow path 660. Vertical flow path 660 connects to the second stage of each pressure reduction flow path 640 to provide a gradual upward reduction in pressure through the stacked plate assembly.

Figure 20:
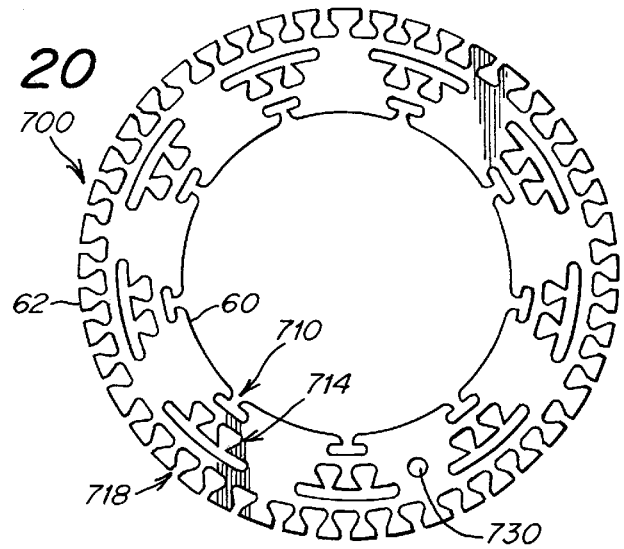
FIG. 20 is a bottom plan view of a first annular plate of a three non-identical plate set used in a stacked plate assembly in accordance with a seventh embodiment of the invention.
Figure 21:
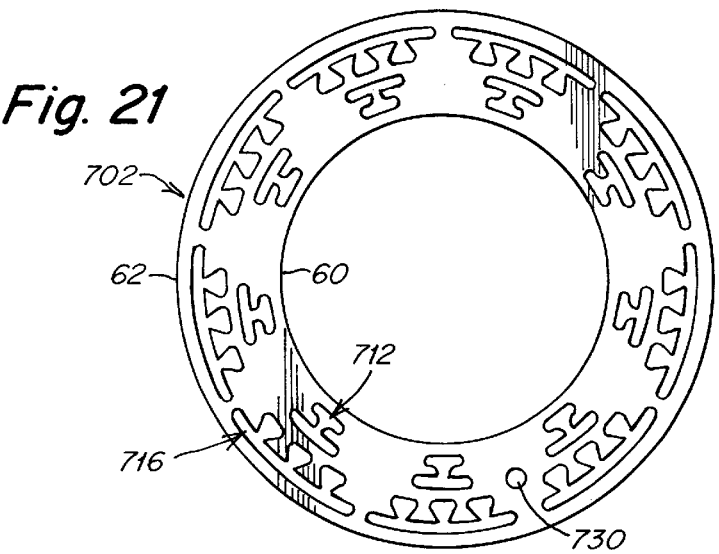
FIG. 21 is a bottom plan view of a second annular plate used in the three non-identical plate set in accordance with the seventh embodiment of the invention.
Figure 22:
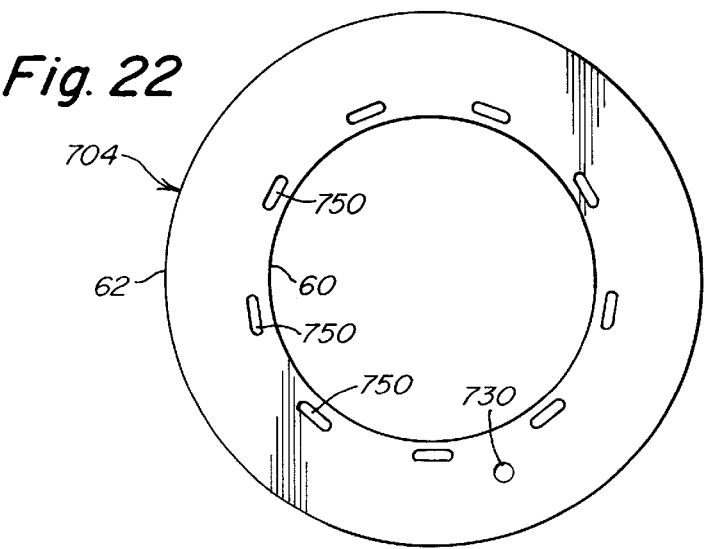
FIG. 22 is a bottom plan view of a third annular plate used in the three non-identical plate set in accordance with the seventh embodiment of the invention.

Each of the embodiments of the stacked plate assembly described above uses a stack of identical annular plates to form a fluid pressure reduction device. A seventh embodiment of the stacked plate assembly utilizes a set of three different plates, as shown in FIGS. 20–22. An annular plate 700 shown in FIG. 20 includes a first pressure reduction stage 710, a third pressure reduction stage 714 and a fifth pressure reduction stage 718 having the same angular positions. The pattern of first, third and fifth stages is repeated a total of nine times around the circumference of annular plate 700. An annular plate 702 shown in FIG. 21 includes a second pressure reduction stage 712 and a fourth pressure reduction stage 716 having the same angular positions. The pattern of second and fourth stages is repeated a total of nine times around the circumference of annular plate 702. An annular plate 704 shown in FIG. 22 has vertical flow passages 750 positioned radially outwardly from inner perimeter 60 and distributed around the circumference of annular plate 704. Each of the annular plates 700, 702 and 704 includes a registration hole 730 for a registration pin. The annular plates 700, 702 and 704 are stacked in repeating order such that each set of three plates 700, 702 and 704 forms a five stage, horizontal pressure reduction flow path and a vertical flow path, as shown in FIGS. 18 and 19.

The embodiment of FIGS. 20–22, which utilizes non-identical annular plates 700, 702 and 704, differs from the embodiment of FIGS. 17–19 by providing nine pressure reduction flow paths in parallel for each set of three plates, as compared with three pressure reduction flow paths in parallel in the embodiment of FIGS. 17–19. Thus, the embodiment of FIGS. 20–22 has higher flow capacity than the embodiment of FIGS. 17–19

Figure 23:
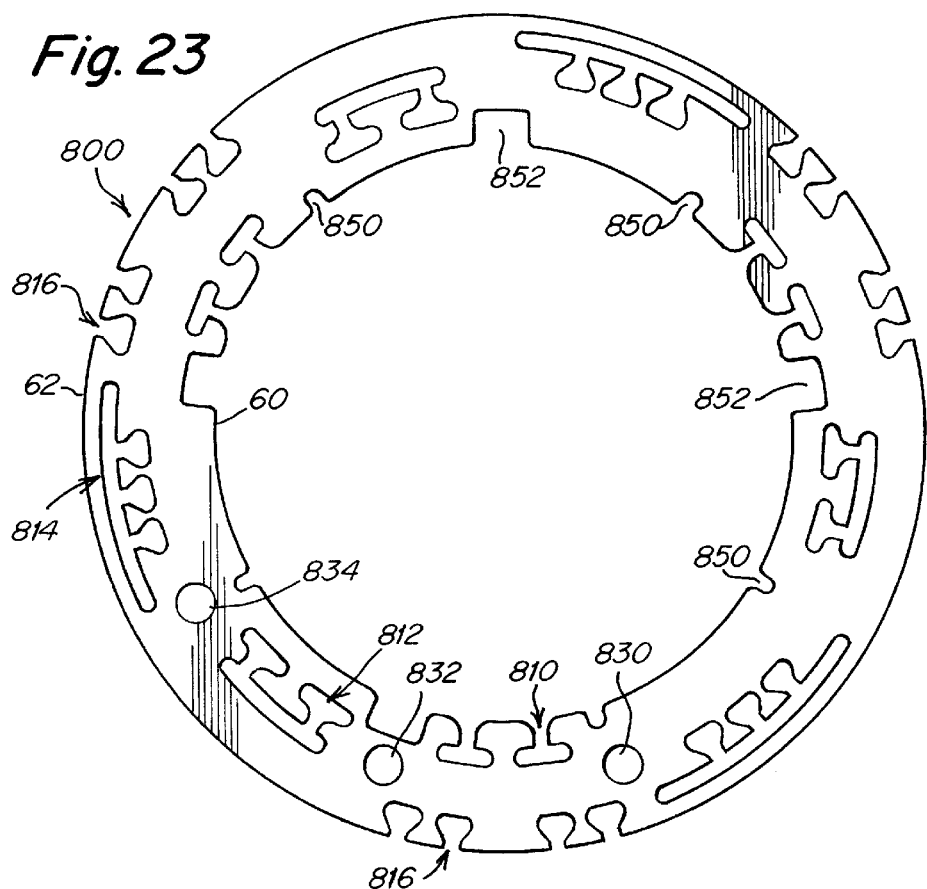
FIG. 23 is a bottom plan view of a four stage annular plate used in a stacked plate assembly in accordance with an eighth embodiment of the invention.
Figure 24:
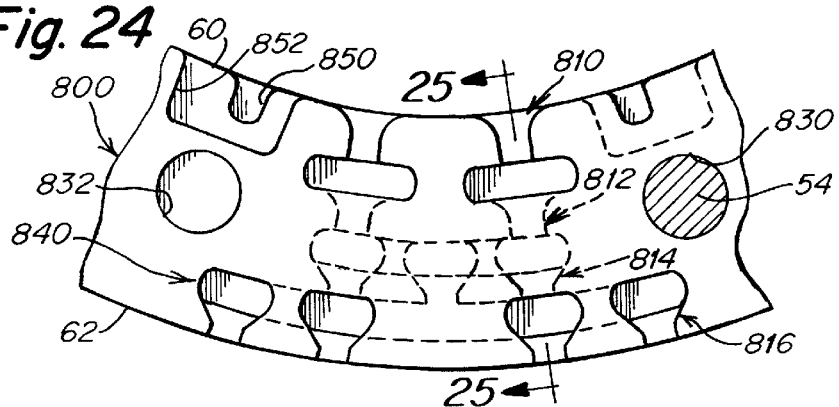
FIG. 24 is an enlarged fragmentary view of a portion of the stacked plate assembly utilizing the annular plate shown in FIG. 23.
Figure 25:
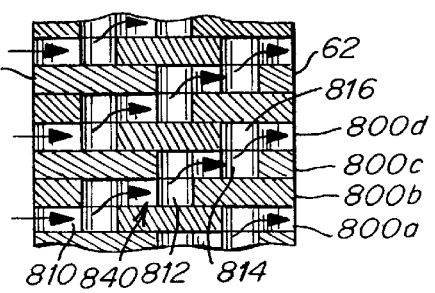
FIG. 25 is an enlarged fragmentary cross-sectional view of the stacked plate assembly, taken along the line 25—25 of FIG. 24.

An eighth embodiment of the stacked plate assembly of the present invention is shown in FIGS. 23–25. The eighth embodiment utilizes a four stage annular plate configuration. An annular plate 800 includes a first pressure reduction stage 810, a second pressure reduction stage 812 rotationally offset from first stage 810 by 40°, a third pressure reduction stage 814 rotationally offset from second stage 812 by 40°, and a fourth pressure reduction stage 816 rotationally offset from third stage 814 by 40°. The four stage pattern is repeated a total of three times around the circumference of plate 800, so that the first stage 810 of each pattern is rotationally aligned with the fourth stage 816 of the adjacent pattern.

Annular plate 800 is further provided with registration holes 830, 832 and 834 rotationally offset from each other by 40°. The stacked plate assembly, as shown in FIGS. 24 and 25, is assembled with registration pin 54 passing through registration hole 830 of plate 800a, through registration hole 832 of plate 800b, through registration hole 834 of plate 800c and through registration hole 830 of plate 800d. Each set of four plates in the stacked plate assembly forms a pressure reduction flow path 840. Pressure reduction flow path 840 extends from inner perimeter 60 through first stage 810 in plate 800a, through second stage 812 in plate 800b, through third stage 814 in plate 800c and through fourth stage 816 in plate 800d to outer perimeter 62. As shown in FIG. 25, pressure reduction flow path 840 has as "diagonal" configuration extending radially outwardly and upwardly through four successive plates of the stacked plate assembly.

Each stage (except the fourth stage) discharges upwardly into the next stage in the adjacent annular plate. As shown in FIG. 24, pressure reduction flow path 840 includes two orifices in first stage 810, two orifices in second stage 812, three orifices in third stage 814 and four orifices in fourth stage 816.

Annular plate 800 is provided with narrow vertical flow passages 850 and wide vertical flow passages 852 that open onto the hollow center of the stacked plate assembly. When annular plates 800a are stacked as described above, vertical flow paths are formed as shown in FIGS. 8 and 9 and described above.

Figure 26:
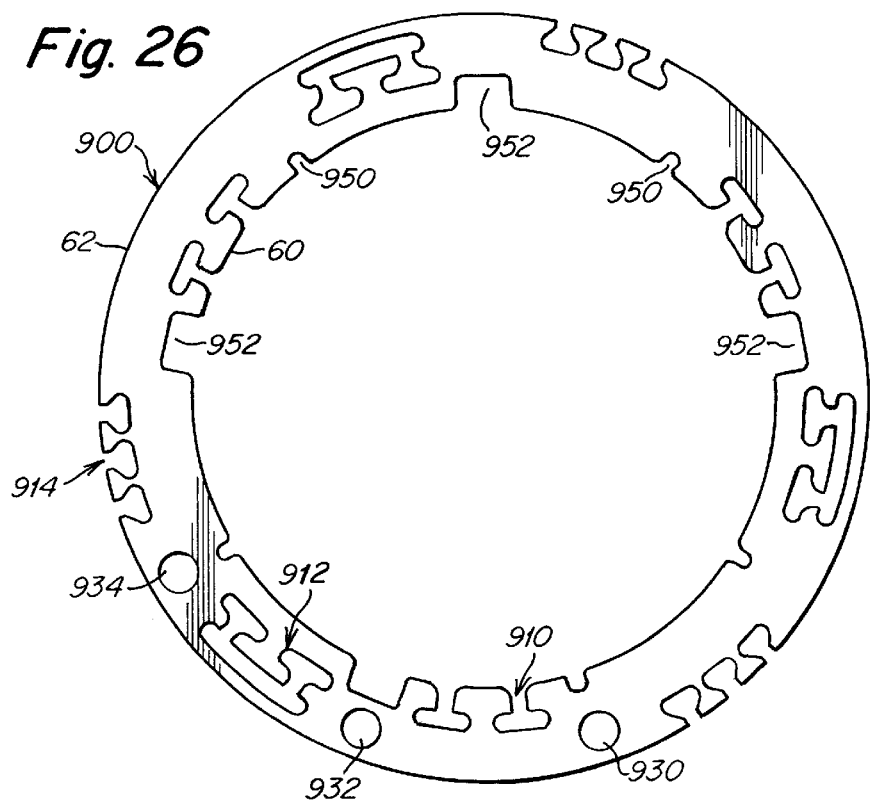
FIG. 26 is a bottom plan view of a three stage annular plate used in a stacked plate assembly in accordance with a ninth embodiment of the invention.
Figure 27:
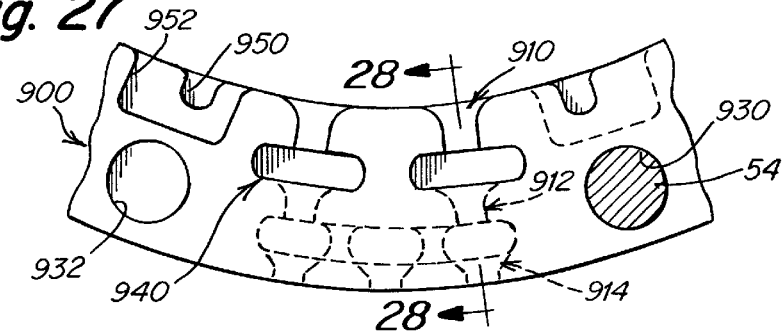
FIG. 27 is an enlarged fragmentary view of a portion of the stacked plate assembly utilizing the annular plate shown in FIG. 26.
Figure 28:
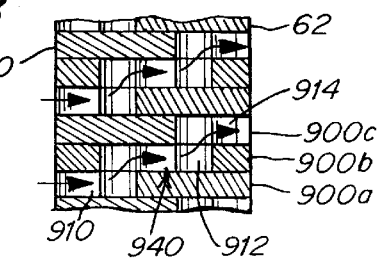
FIG. 28 is an enlarged fragmentary cross-sectional view of the stacked plate assembly, taken along the line 28—28 of FIG. 27.

A ninth embodiment of the stacked plate assembly of the present invention is shown in FIGS. 26–28. The embodiment of FIGS. 26–28 utilizes a three stage annular plate configuration. Annular plate 900 is provided with a first pressure reduction stage 910, a second pressure reduction stage 912 rotationally offset from first stage 910 by 40° and a third pressure reduction stage 914 rotationally offset from second stage 912 by 40°. The three stage pattern is repeated a total of three times around the circumference of annular plate 900. Each stack of three annular plates 900 forms a three stage pressure reduction flow path 940, as shown in FIGS. 27 and 28. Plate 900 includes registration holes 930, 932 and 934. An annular plate 900a has registration 54 pin passing through registration hole 930, plate 900b has registration pin 54 passing through registration hole 932, and plate 900c has registration pin 54 passing through registration hole 934. First stage 910 has two orifices, second stage 912 has two orifices and third stage 914 has three orifices. As shown in FIG. 28, a pressure reduction flow path 940 extends from inner perimeter 60 through first stage 910 in plate 900a, through second stage 912 in plate 900b and through third stage 914 in plate 900c to outer perimeter 62. Pressure reduction flow path 940 has a "diagonal" direction radially outwardly and upwardly through the stacked plate assembly.

Annular plate 900 is provided with narrow vertical flow passages 950 and wide vertical flow passages 952 adjoining the hollow center of the stacked plate assembly. When annular plates 900a re stacked as described above, vertical flow paths are formed through the stack as described above in connection with FIGS. 8 and 9.

In summary, the stacked plate assembly may be characterized as follows.

1. The stacked plate assembly has a plurality of pressure reduction flow paths having inlets at inner perimeter 60 and outlets at outer perimeter 62. More or fewer flow paths carry fluid depending on the position of movable valve plug 32.

2. The pressure reduction flow paths are defined by two or more pressure reduction stages coupled in series. Each pressure reduction stage is coupled to another pressure reduction stage in an adjacent annular plate. The pressure reduction stages may alternate between two plates or may progress through successive plates. Each stage except the last involves radial flow through an orifice into a communication passage followed by axial flow into the next stage in an adjacent plate (the last stage involves only radial flow through an orifice to the outer perimeter of the stacked plate assembly).

3. Each stage includes one or more orifices. Each orifice has a well-rounded or well-tapered inlet and an abrupt discharge. In each stage except the last, the orifices discharge into a communication passage that is relatively wide in the circumferential direction and is relatively narrow in the radial direction. In the last stage, the orifices discharge into the space surrounding the stacked plate assembly. Each stage except the first includes one or more transfer passages for receiving fluid from the communication passage of the previous stage in the adjacent annular plate. The first stage receives fluid from the hollow center of the stacked plate assembly. The width of each communication passage in the circumferential direction is preferably at least 3.5 times the width of the corresponding orifice. Where two or more orifices discharge into a single communication passage, the ratio of the width of the communication passage to the combined widths of the orifices is preferably 3.5 or greater. The radial dimension of the communication passage is preferably approximately equal to the thickness of the annular plate. The number of orifices and/or the cross-sectional areas of the orifices increases along the flow path from inner perimeter 60 to outer perimeter 62. Each stage is characterized by a velocity head loss greater than 75% and by a corresponding pressure recovery less than 25%, thereby reducing the risk of cavitation.

Figure 30:
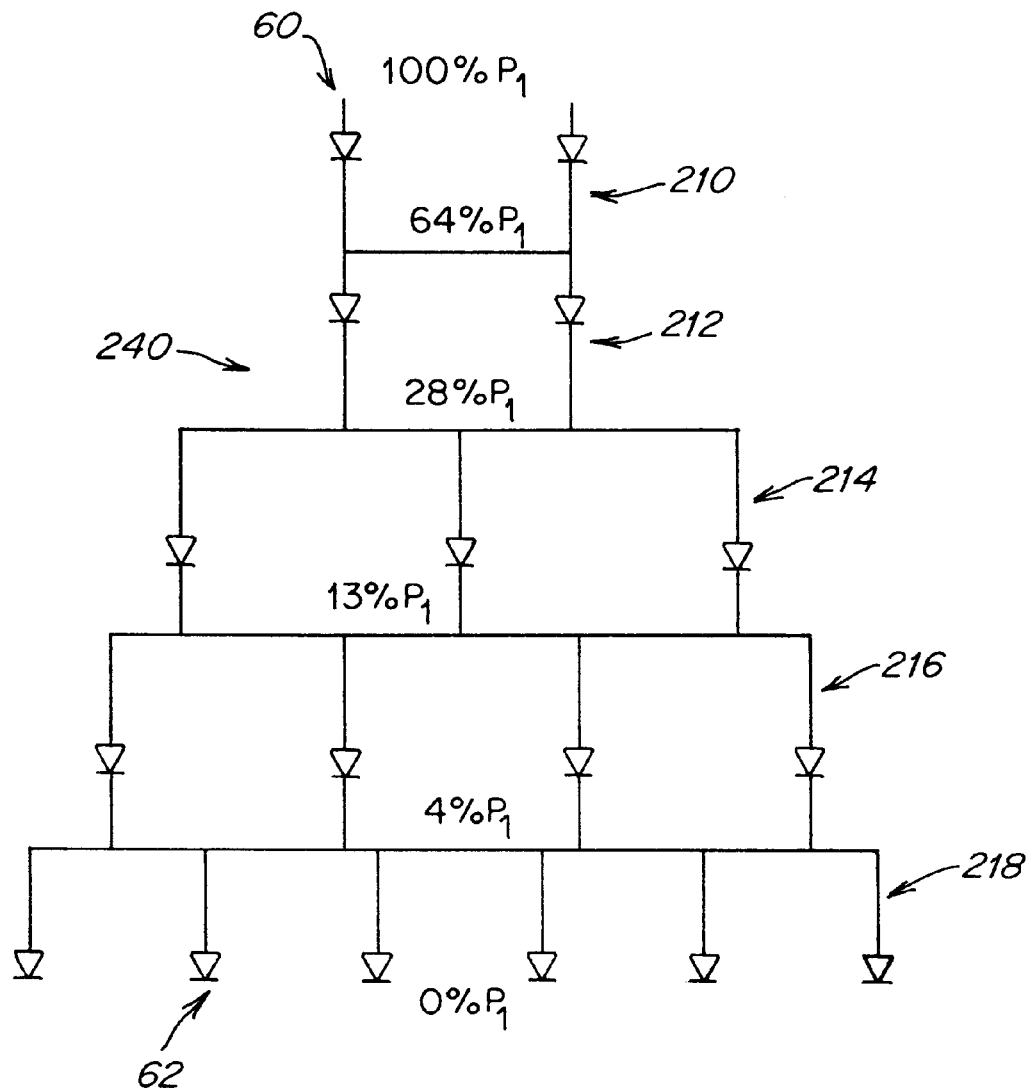
FIG. 30 is a schematic diagram of the pressure reduction flow path in the second embodiment of the stacked plate assembly in accordance with the invention.

The performance of a stacked plate assembly utilizing annular plate 200 shown in FIG. 10 to provide a five stage horizontal flow path has been calculated. The static pressure as a percentage of the pressure at the hollow center of the stacked plate assembly is plotted as a function of distance along the flow path through the stacked plate assembly. Each stage is indicated by a pressure drop followed by a relatively low pressure recovery. Cavitation may occur only at the final discharge orifice in fifth stage 218. However, this occurs away from structural parts and plates, and no detrimental effects are produced. A schematic diagram indicating the flow paths in pressure reduction flow path 240 and the pressure level at each stage is shown in FIG. 30. The stacked plate assemblies described above have employed fluid flow from the inner perimeter to the outer perimeter. However, the annular plates may be configured for fluid flow from the outer perimeter to the inner perimeter of the stacked plate assembly.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A fluid pressure reduction device comprising:
   a stack of annular plates having a hollow center, a fluid inlet at a first perimeter thereof and a fluid outlet at a second perimeter thereof;
   selected ones of said plates each defining at least one pressure reduction stage comprising an orifice having a well-rounded or well-tapered inlet and an abrupt discharge, said orifice having walls which do not diverge in a downstream direction between said inlet and said abrupt discharge, and a communication passage coupled to said discharge; and
   each pressure reduction stage communicating with another pressure reduction stage in an adjacent one of the annular plates in said stack, two or more of said pressure reduction stages being coupled in series to define a pressure reduction flow path from said fluid inlet to said fluid outlet.

2. A fluid pressure reduction device as defined in claim 1 for use with a movable plug engaged within the hollow center, wherein said annular plates define at least one axial flow path through said stack for gradual reduction of fluid pressure at different axial levels in said stack of annular plates.

3. A fluid pressure reduction device as defined in claim 2 wherein said axial flow path opens onto the hollow center of said stack of annular plates for gradual reduction of fluid pressure between said annular plates and said movable plug at different axial levels in said stack of annular plates.

4. A fluid pressure reduction device as defined in claim 2 wherein said axial flow path is located radially outwardly of the hollow center of said stack of annular plates.

5. A fluid pressure reduction device as defined in claim 1 wherein said pressure reduction flow path is defined by a plurality of pressure reduction stages in series and includes radial and axial flow components which alternate between adjacent plates in said stack of annular plates.

6. A fluid pressure reduction device as defined in claim 1 wherein said pressure reduction flow path is defined by a plurality of pressure reduction stages in series and includes radial and axial flow components through successive plates in said stack of annular plates, and wherein the number of annular plates defining said pressure reduction flow path is equal to the number of pressure reduction stages in said pressure reduction flow path.

7. A fluid pressure reduction device as defined in claim 1 wherein said pressure reduction flow path is defined by identical annular plates rotated relative to each other.

8. A fluid pressure reduction device as defined in claim 1 wherein said pressure reduction flow path is defined by two or more non-identical annular plates.

9. A fluid pressure reduction device as defined in claim 1 wherein the number of orifices discharging into the communication passage increases along said pressure reduction flow path.

10. A fluid pressure reduction device as defined in claim 1 wherein the flow areas of said orifices increase along said pressure reduction flow path.

11. A fluid pressure reduction device as defined in claim 1 wherein said annular plates define a plurality of pressure reduction flow paths in parallel between said first perimeter and said second perimeter.

12. A fluid pressure reduction device as defined in claim 1 wherein said communication passage has a width that is at least 3.5 times the width of said orifice.

13. A fluid pressure reduction device as defined in claim 1 wherein each pressure reduction stage is characterized by a velocity head loss greater than 75%.

14. A fluid pressure reduction device as defined in claim 1 wherein each pressure reduction stage is characterized by a pressure recovery less than 25%.

15. A fluid pressure reduction device as defined in claim 1 wherein said pressure reduction flow path includes alternating radial and axial flow components and wherein said axial flow components have one direction.

16. A fluid pressure reduction device as defined in claim 1 wherein said pressure reduction flow path includes alternating radial and axial flow components and wherein successive axial flow components have opposite axial directions.

17. A fluid control valve comprising:
   a valve body having a fluid passageway;
   a valve seat in said fluid passageway;
   a valve plug that is movable with respect to said valve seat for controlling the flow of fluid through said fluid passageway; and
   a fluid pressure reduction device mounted in said fluid passageway for reducing fluid pressure, said pressure reduction device comprising:
     a stack of annular plates having a hollow center through which said valve plug is movable, a fluid inlet at a first perimeter thereof and a fluid outlet at a second perimeter thereof;
     selected ones of said plates each defining at least one pressure reduction stage comprising an orifice having a well-rounded or well-tapered inlet and an abrupt discharge, said orifice having walls which do not diverge in a downstream direction between said inlet and said abrupt discharge, and a communication passage coupled to said discharge; and
     each pressure reduction stage communicating with another pressure reduction stage in an adjacent one of said annular plates in said stack, two or more of said pressure reduction stages being coupled in series to define a pressure reduction flow path from said fluid inlet to said fluid outlet.

18. A fluid control valve as defined in claim 17 wherein said annular plates define at least one axial flow path through said stack for gradual reduction of fluid pressure at different axial levels in said stack of annular plates.

19. A fluid control valve as defined in claim 18 wherein said axial flow path opens onto the hollow center of said stack of annular plates for gradual reduction of fluid pressure between said annular plates and said movable plug at different axial levels in said stack of annular plates.

20. A fluid control valve as defined in claim 18 wherein said axial flow path is located radially outwardly of the hollow center of said stack of annular plates.

21. A fluid control valve as defined in claim 17 wherein said pressure reduction flow path is defined by a plurality of pressure reduction stages in series and includes radial and axial flow components which alternate between adjacent plates in said stack of annular plates.

22. A fluid control valve as defined in claim 17 wherein said pressure reduction flow path is defined by a plurality of pressure reduction stages in series and includes radial and axial flow components through successive plates in said stack of annular plates, and wherein the number of annular plates defining said pressure reduction flow path is equal to the number of pressure reduction stages in said pressure reduction flow path.

23. A fluid control valve as defined in claim 17 wherein said pressure reduction flow path is defined by identical annular plates rotated relative to each other.

24. A fluid control valve as defined in claim 17 wherein said pressure reduction flow path is defined by two or more non-identical annular plates.

25. A fluid control valve as defined in claim 17 wherein the number of orifices discharging into the communication passage increases along said pressure reduction flow path.

26. A fluid control valve as defined in claim 17 wherein the flow areas of said orifices increase along said pressure reduction flow path.

27. A fluid control valve as defined in claim 17 wherein said annular plates define a plurality of pressure reduction flow paths between said first perimeter and said second perimeter.

28. A fluid control valve as defined in claim 17 wherein said communication passage has a width that is at least 3.5 times the width of said orifice.

29. A fluid control valve as defined in claim 17 wherein each pressure reduction stage is characterized by a velocity head loss greater than 75%.

30. A fluid control valve as defined in claim 17 wherein each pressure reduction stage is characterized by a pressure recovery less than 25%.

31. A fluid control valve as defined in claim 17 wherein said pressure reduction flow path includes alternating radial and axial flow components and wherein said axial flow components have one direction.

32. A fluid control valve as defined in claim 17 wherein said pressure reduction flow path includes alternating radial and axial flow components and wherein successive axial flow components have opposite axial directions.

33. A fluid control valve as defined in claim 17 wherein said first perimeter is an inner perimeter of said stack of annular plates adjacent to said valve plug and said second perimeter is an outer perimeter of said stack of annular plates.

34. A fluid pressure reduction device comprising:
a stack of annular plates having a hollow center, a fluid inlet at a first perimeter thereof and a fluid outlet at a second perimeter thereof;
selected ones of said plates each defining at least one pressure reduction stage comprising an orifice having a well-rounded or well-tapered inlet and an abrupt discharge, and a communication passage coupled to said discharge, wherein each pressure reduction stage is characterized by a pressure recovery less than 25%; and
each pressure reduction stage communicating with another pressure reduction stage in an adjacent one of the annular plates in said stack, two or more of said pressure reduction stages being coupled in series to define a pressure reduction flow path from said fluid inlet to said fluid outlet.

35. A fluid pressure reduction device comprising:
a stack of annular plates having a hollow center, a fluid inlet at a first perimeter thereof and a fluid outlet at a second perimeter thereof;
selected ones of said plates each defining at least one pressure reduction stage comprising an orifice having a well-rounded or well-tapered inlet and an abrupt discharge, and a communication passage coupled to said discharge, wherein each pressure reduction stage is characterized by a velocity head loss greater than 75%; and
each pressure reduction stage communicating with another pressure reduction stage in an adjacent one of the annular plates in said stack, two or more of said pressure reduction stages being coupled in series to define a pressure reduction flow path from said fluid inlet to said fluid outlet.

36. A fluid pressure reduction device comprising:
a stack of annular plates having a hollow center, a fluid inlet at a first perimeter thereof and a fluid outlet at a second perimeter thereof;
selected ones of said plates each defining at least one pressure reduction stage comprising an orifice having a well-rounded or well-tapered inlet and an abrupt discharge, said orifice having walls which do not diverge in a downstream direction between said inlet and said abrupt discharge, and a communication passage coupled to said discharge;
each pressure reduction stage communicating with another pressure reduction stage in an adjacent one of the annular plates in said stack, two or more of said pressure reduction stages being coupled in series to define a pressure reduction flow path from said fluid inlet to said fluid outlet; and
said annular plates defining at least one axial flow path through said stack for gradual reduction of fluid pressure at different axial levels in said stack of annular plates.

37. A fluid pressure reduction device comprising:
a stack of annular plates having a hollow center, a fluid inlet at a first perimeter thereof and a fluid outlet at a second perimeter thereof;
selected ones of said plates each defining at least one pressure reduction stage comprising an orifice having a well-rounded or well-tapered inlet and an abrupt discharge, said orifice having walls which do not diverge in a downstream direction between said inlet and said abrupt discharge, and a communication passage coupled to said discharge; and
each pressure reduction stage communicating with another pressure reduction stage in an adjacent one of the annular plates in said stack, two or more of said pressure reduction stages being coupled in series to define a pressure reduction flow path from said fluid inlet to said fluid outlet, wherein said pressure reduction flow path includes radial and axial flow components which alternate between two adjacent plates in said stack of annular plates.

38. A fluid pressure reduction device comprising:
a stack of annular plates having a hollow center, a fluid inlet at a first perimeter thereof and a fluid outlet at a second perimeter thereof;
selected ones of said plates each defining at least one pressure reduction stage comprising an orifice having a well-rounded or well-tapered inlet and an abrupt discharge, said orifice having walls which do not diverge in a downstream direction between said inlet and said abrupt discharge, and a communication passage coupled to said discharge; and
each pressure reduction stage communicating with another pressure reduction stage in an adjacent one of the annular plates in said stack, two or more of said pressure reduction stages being coupled in series to define a pressure reduction flow path from said fluid inlet to said fluid outlet, wherein said pressure reduction flow path includes radial and axial flow components through successive plates in said stack of annular plates and wherein the number of annular plates defining said pressure reduction flow path is equal to the number of pressure reduction stages in said pressure reduction flow path.

39. A fluid pressure reduction device comprising:

a stack of annular plates having a hollow center, a fluid inlet at a first perimeter thereof and a fluid outlet at a second perimeter thereof;

selected ones of said plates each defining at least one pressure reduction stage comprising an orifice having a well-rounded or well-tapered inlet and an abrupt discharge, and a communication passage coupled to said discharge and having a width that is at least 3.5 times the width of said orifice; and each pressure reduction stage communicating with another pressure reduction stage in an adjacent one of the annular plates in said stack, two or more of said pressure reduction stages being coupled in series to define a pressure reduction flow path from said fluid inlet to said fluid outlet.

* * * * *